US012181591B2

(12) United States Patent
Li et al.

(10) Patent No.: US 12,181,591 B2
(45) Date of Patent: Dec. 31, 2024

(54) MULTIMODAL LOCATION SENSING ON A MOBILE PHONE

(71) Applicant: Huawei Technologies Co., Ltd., Shenzhen (CN)

(72) Inventors: Baopu Li, Santa Clara, CA (US); Juan Chen, Campbell, CA (US); Yiwei Zhao, San Jose, CA (US); Jun Yang, Milpitas, CA (US); Wenyou Sun, Cupertino, CA (US); Shuo Huang, Los Gatos, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 847 days.

(21) Appl. No.: 17/011,887

(22) Filed: Sep. 3, 2020

(65) Prior Publication Data
US 2020/0400773 A1 Dec. 24, 2020

Related U.S. Application Data

(63) Continuation of application No. PCT/CN2019/084771, filed on Apr. 28, 2019.
(Continued)

(51) Int. Cl.
*G01S 5/00* (2006.01)
*G01S 5/02* (2010.01)
(Continued)

(52) U.S. Cl.
CPC ............. *G01S 5/0027* (2013.01); *G01S 5/01* (2020.05); *G01S 5/0295* (2020.05); *G01S 19/02* (2013.01);
(Continued)

(58) Field of Classification Search
CPC ........ G01S 5/0027; G01S 5/01; G01S 5/0295; G01S 19/02; G01S 19/396; H04W 4/029; H04W 4/027
See application file for complete search history.

(56) References Cited

U.S. PATENT DOCUMENTS

| 9,712,976 B1 | 7/2017 | Liu et al. |
| 9,756,607 B1 | 9/2017 | DeLuca |

(Continued)

FOREIGN PATENT DOCUMENTS

| CN | 1852353 A | 10/2006 |
| CN | 101675320 A | 3/2010 |

(Continued)

OTHER PUBLICATIONS

Yan et al., "Research and application of clustering algorithm based on factor of time and space," Application Research of Computers, Dec. 2013, with an English abstract total 5 pages.

*Primary Examiner* — Erika A Washington
(74) *Attorney, Agent, or Firm* — Slater Matsil, LLP

(57) ABSTRACT

Embodiments of this disclosure provide techniques used in a location sensing service and a timeline service implemented in a host device for providing location history. In particular, the location sensing service may passively collect location coordinates of the device using requests made by third party applications. The location sensing service may receive a signal comprising an intent for a location request in response to a change in the user activity or in response to a change in a cellular identification of the device. The device may determine that a time elapsed from a previous location request and a time corresponding with receiving one or more of the signals exceed a time threshold and, based thereon, request a location coordinate of the device.

19 Claims, 10 Drawing Sheets

Related U.S. Application Data

(60) Provisional application No. 62/730,733, filed on Sep. 13, 2018.

(51) Int. Cl.
  *G01S 19/02* (2010.01)
  *G01S 19/39* (2010.01)
  *H04W 4/02* (2018.01)
  *H04W 4/029* (2018.01)

(52) U.S. Cl.
  CPC .......... *G01S 19/396* (2019.08); *H04W 4/027* (2013.01); *H04W 4/029* (2018.02)

(56) References Cited

U.S. PATENT DOCUMENTS

| | | |
|---|---|---|
| 10,163,113 B2 | 12/2018 | Mehta et al. |
| 2006/0128395 A1 | 6/2006 | Muhonen |
| 2010/0030463 A1 | 2/2010 | Tomizawa |
| 2011/0071881 A1 | 3/2011 | Zheng et al. |
| 2011/0159884 A1* | 6/2011 | Chawla .................. G01S 5/019 455/456.1 |
| 2011/0208425 A1 | 8/2011 | Zheng et al. |
| 2013/0035111 A1 | 2/2013 | Moeglein et al. |
| 2013/0252633 A1 | 9/2013 | Liang et al. |
| 2013/0252638 A1 | 9/2013 | Yang et al. |
| 2013/0267255 A1 | 10/2013 | Liu et al. |
| 2013/0316726 A1 | 11/2013 | Laws et al. |
| 2016/0105764 A1* | 4/2016 | Evans .................. G08B 21/24 340/539.13 |
| 2016/0127486 A1* | 5/2016 | Chen .................. H04W 4/029 709/206 |
| 2016/0267762 A1 | 9/2016 | Ye et al. |
| 2017/0153313 A1 | 6/2017 | Tsai et al. |
| 2018/0202821 A1 | 7/2018 | Yu et al. |
| 2020/0327179 A1 | 10/2020 | Matsumoto et al. |

FOREIGN PATENT DOCUMENTS

| | | |
|---|---|---|
| CN | 102047697 A | 5/2011 |
| CN | 102607584 A | 7/2012 |
| CN | 102829774 A | 12/2012 |
| CN | 103200610 A | 7/2013 |
| CN | 103218442 A | 7/2013 |
| CN | 103875260 A | 6/2014 |
| CN | 103986782 A | 8/2014 |
| CN | 104159189 A | 11/2014 |
| CN | 104350776 A | 2/2015 |
| CN | 105101095 A | 11/2015 |
| CN | 105472552 A | 4/2016 |
| CN | 105874857 A | 8/2016 |
| CN | 106324630 A | 1/2017 |
| CN | 106714104 A | 5/2017 |
| CN | 107172590 A | 9/2017 |
| CN | 107389083 A | 11/2017 |
| CN | 108072886 A | 5/2018 |
| CN | 108197971 A | 6/2018 |
| CN | 108520028 A | 9/2018 |
| DE | 102017111103 A1 | 11/2017 |
| JP | 2017194850 A | 10/2017 |

\* cited by examiner

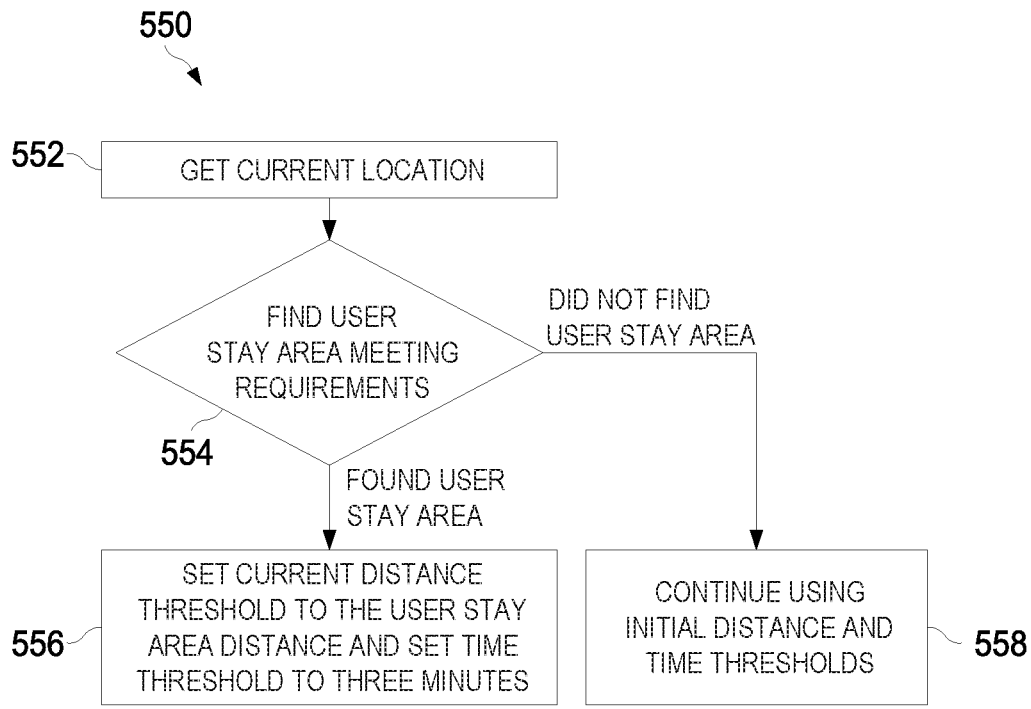
FIG. 12
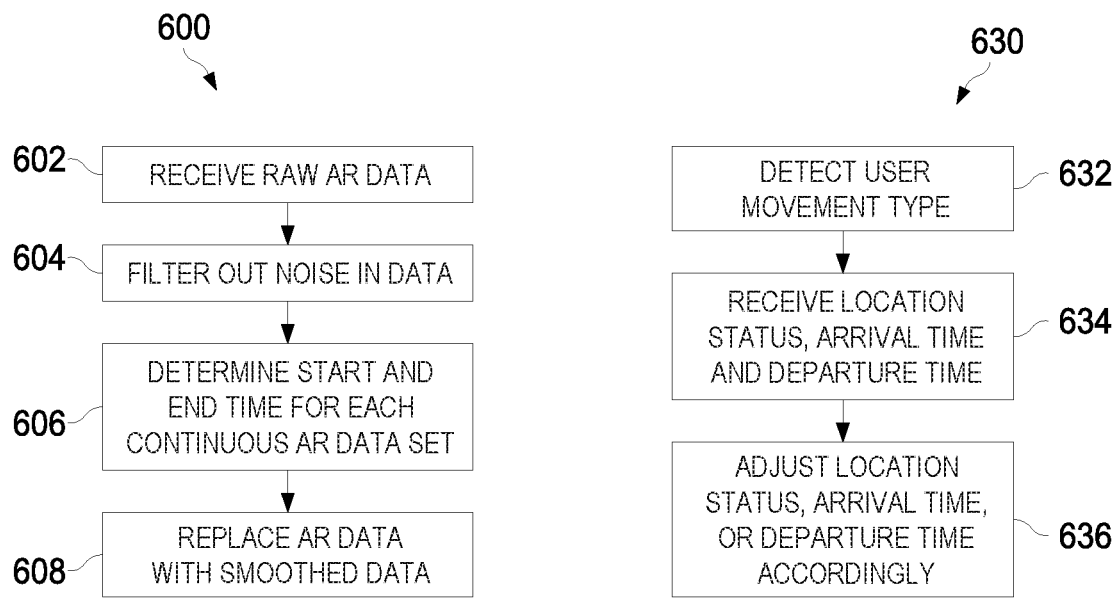
FIG. 13
FIG. 14

MULTIMODAL LOCATION SENSING ON A MOBILE PHONE

CROSS-REFERENCE TO RELATED APPLICATIONS

This application is a continuation of International Application No. PCT/CN2019/084771, filed on Apr. 28, 2019, which claims priority to U.S. Provisional Patent Application No. 62/730,733 filed Sep. 13, 2018 titled "Multimodal Location Sensing on a Mobile Phone", all of which are incorporated by reference in its entirety.

TECHNICAL FIELD

The present disclosure relates generally to an electronic device, and, in particular embodiments, to a system and method for location sensing in an electronic device.

BACKGROUND

Modern electronic devices typically include a location service application to allow websites and applications to use information from Wi-Fi, cellular, Bluetooth, and Global Positioning system (GPS) networks to determine an approximate location of the host device. The location service, if enabled, may also record significant or frequently visited locations with an associated timestamp. As an example, a host device may record a user's daily traffic commutes to provide location based suggestions, enable behavior-based features to the user, or to aggregate user data. The host device may display an alert to notify the user of unusual traffic activity prior to a morning commute based on the recorded historical data. In another example, a user can use a website or a second device to determine the last location of the electronic device using the recorded location history information.

Generally, existing methods fail to provide continuous, accurate, and resource efficient solutions for location based sensing. And in some solutions, segments of a user's location history are uploaded to a cloud based service for processing and/or storage, which present additional security and privacy concerns to users. It is beneficial to provide an efficient solution, both in terms of local processing and network usage, for collecting location-based data in an electronic device.

SUMMARY

Technical advantages are generally achieved by embodiments of this disclosure, which describe location sensing in an electronic device.

In accordance with an embodiment, a device for location sensing is provided. The device includes one or more embedded sensors configured to detect a change in a user activity. The device also includes a non-transitory memory storage including instructions and one or more processors in communication with the non-transitory memory storage and the one or more embedded sensors. The one or more processors execute the instructions to passively collect location coordinates of the device using location information requested by a third party application or service, receive a signal including an intent for a location request in response to the change in the user activity, and determine that a duration of time between reception of a previous location request and reception of the signal exceeds a time threshold and, based thereon, request a location coordinate of the device. In one example, the one or more processors execute the instructions to receive a second signal including an intent for a location request in response to a change in a cellular identification (Cell-ID) of the device, and determine that a time elapsed from a previous location request and a time corresponding with receiving the second signal exceeds the time threshold and, based thereon, requesting a second location coordinate of the device. Optionally, in such an example, or in another example, the one or more processors is an application processor. Optionally, in any one of the above-mentioned examples, or in another example, one of the one or more processors is a low-power microcontroller. Optionally, in any one of the above-mentioned examples, or in another example, the device further includes a global positioning satellite (GPS) module configured to collect location coordinates of the device. Optionally, in any one of the above-mentioned examples, or in another example, the device includes a network location provider (NLP) module configured to collect location coordinates of the device. Optionally, in any one of the above-mentioned examples, or in another example, the one or more processors execute the instructions to select a source for collecting the location coordinate of the device, and collect the location coordinate of the device in accordance with the request. Optionally, in any one of the above-mentioned examples, or in another example, the source is at least one of the GPS module or the NLP module, or a combination thereof. Optionally, in any one of the above-mentioned examples, or in another example, the one or more embedded sensors is selected from the group consisting of an accelerometer, a gyroscope, a magnetic sensor, a modem, a proximity sensor, and combinations thereof. Optionally, in any one of the above-mentioned examples, or in another example, the one or more embedded sensors includes at least one of an accelerometer, a gyroscope, a magnetic sensor, a modem, or a proximity sensor, or a combination thereof. Optionally, in any one of the above-mentioned examples, or in another example, the device further includes a first microcontroller in communication with the one or more processors, the non-transitory memory storage, and the one or more embedded sensors. Optionally, in any one of the above-mentioned examples, or in another example, receiving the signal includes determining, by the first microcontroller, that a total distance traveled by the device exceeds a total distance traveled threshold and, based thereon, signaling the intent for the location request to the one or more processors. Optionally, in any one of the above-mentioned examples, or in another example, receiving the signal includes determining, by the first microcontroller, that the time elapsed from the previous location request exceeds a second time threshold and, based thereon, signaling the intent for the location request to the one or more processors. Optionally, in any one of the above-mentioned examples, or in another example, the one or more processors execute the instructions to determine that the device is within a user stay area and, based thereon, setting the time threshold. Optionally, in any one of the above-mentioned examples, or in another example, the one or more processors execute the instructions to determine that the device is within a user stay area and, based thereon, setting the distance threshold. Optionally, in any one of the above-mentioned examples, or in another example, the one or more processors execute the instructions to determine that the device is not located within a user stay area and, based thereon, setting the time threshold. Optionally, in any one of the above-mentioned examples, or in another example, the one or more processors execute the instructions to determine that the device is not located within a user stay area and, based thereon, setting the distance threshold. Optionally, in any one of the above-mentioned examples, or in another example, the one or more processors execute the instructions to determine that the change in the user activity corresponds to one of a still movement type, a slow movement type, or a fast movement type of the device and, based thereon, setting the time threshold. Optionally, in any one of the above-mentioned examples, or in another example, the one or more processors execute the instructions to determine that the change in the user activity corresponds to one of a still movement type, a slow movement type, or a fast movement type of the device and, based thereon, setting the distance threshold. Optionally, in any one of the above-mentioned examples, or in another example, the device further includes a second microcontroller in communication with the one or more processors and the non-transitory memory storage. The second microcontroller being configured to signal the intent for the location request to the one or more processors. Optionally, in any one of the above-mentioned examples, or in another example, receiving the second signal includes determining, by the second microcontroller, that the device is located within a user stay area, determining, by the second microcontroller, the change in the Cell-ID, determining, by the second microcontroller, that the change in the user activity since a last Cell-ID change is a slow movement type or a fast movement type, and signaling the intent for the location request to the one or more processors. Optionally, in any one of the above-mentioned examples, or in another example, receiving the second signal includes determining, by the second microcontroller, that the device is not located within a user stay area, determining, by the second microcontroller, the change in the Cell-ID, determining, by the second microcontroller, that the change in the user activity since a last Cell-ID change is a still movement type or a slow movement type, and signaling the intent for the location request to the one or more processors. Optionally, in any one of the above-mentioned examples, or in another example, receiving the second signal includes determining, by the second microcontroller, that a time elapsed since a last Cell-ID change exceeds a third time threshold, determining, by the second microcontroller, that the device is located within a user stay area, determining, by the second microcontroller, that the change in the user activity since the last Cell-ID change is a slow movement type or fast movement type, and signaling the intent for the location request to the one or more processors. Optionally, in any one of the above-mentioned examples, or in another example, receiving the second signal includes determining, by the second microcontroller, that a time elapsed since a last Cell-ID change exceeds a third time threshold, determining, by the second microcontroller, that the device is not located within a user stay area, and signaling the intent for the location request to the one or more processors. Optionally, in any one of the above-mentioned examples, or in another example, the one or more processors execute the instructions to receive a timeline service signal indicating that the device is entering a user stay area. Optionally, in any one of the above-mentioned examples, or in another example, the one or more processors execute the instructions to signal an indication to the first microcontroller including the distance traveled threshold, the second time threshold, and that the device is entering a user stay area. Optionally, in any one of the above-mentioned examples, or in another example, the one or more processors execute the instructions to receive a timeline service signal indicating that the device is exiting a user stay area. Optionally, in any one of the above-mentioned examples, or in another example, the one or more processors execute the instructions to signal an indication to the first microcontroller including the distance traveled threshold, the second time threshold, and that the device is exiting a user stay area. Optionally, in any one of the above-mentioned examples, or in another example, requesting a location coordinate of the device includes determining that the device is connected to an active network location provider, determining that an accuracy of the location coordinates provided by the network location provider exceeds an accuracy threshold, and collecting the location coordinate of the device using the network location provider. Optionally, in any one of the above-mentioned examples, or in another example, requesting a location coordinate of the device includes determining that the device is connected to an active network location provider, determining that an accuracy of the location coordinates provided by the network location provider is less than an accuracy threshold, and collecting the location coordinate of the device using global positioning satellite signals. Optionally, in any one of the above-mentioned examples, or in another example, requesting a location coordinate of the device includes determining that the device is not connected to an active network location provider and collecting the location coordinates of the device using global positioning satellite signals. Optionally, in any one of the above-mentioned examples, or in another example, requesting a location coordinate of the device further includes recording a timestamp corresponding to the collecting the location coordinate of the device.

In accordance with another embodiment, a computer-implemented method for a location sensing service in a device is provided. The computer-implemented method includes passively collecting, with one or more processors, location coordinates of the device using location information requested by a third party application or service, receiving, with the one or more processors, a signal including an intent for a location request in response to a change in a user activity, and determining, with the one or more processors, that a duration of time between reception of a previous location request and reception of the signal exceeds a time threshold and, based thereon, request a location coordinate of the device. In one example, the computer-implemented method further includes receiving, with the one or more processors, a second signal including an intent for a location request in response to a change in a cellular identification (Cell-ID) of the device, and determining, with the one or more processors, that a time elapsed from a previous location request and a time corresponding with receiving the second signal exceeds the time threshold and, based thereon, requesting a second location coordinate of the device. Optionally, in such an example, or in another example, one of the one or more processors is an application processor. Optionally, in any one of the above-mentioned examples, or in another example, one of the one or more processors is a low-power microcontroller. Optionally, in any one of the above-mentioned examples, or in another example, the device includes a global positioning satellite (GPS) module used to collect location coordinates of the device. Optionally, in any one of the above-mentioned examples, or in another example, the device includes a network location provider (NLP) module used to collect location coordinates of the device. Optionally, in any one of the above-mentioned examples, or in another example, the device includes one or more embedded sensors used to detect a change in the user activity. Optionally, in any one of the above-mentioned examples, or in another example, the computer-implemented method further includes selecting, with the one or more processors, a source for collecting the location coordinate of the device and collecting, with the one or more processors, the location coordinate of the device in accordance with the request. Optionally, in any one of the above-mentioned examples, or in another example, the source is the GPS module or the NLP module. Optionally, in any one of the above-mentioned examples, or in another example, the one or more embedded sensors is selected from the group consisting of an accelerometer, a gyroscope, a magnetic sensor, a modem, a proximity sensor, and combinations thereof. Optionally, in any one of the above-mentioned examples, or in another example, the one or more embedded sensors includes at least one of an accelerometer, a gyroscope, a magnetic sensor, a modem, or a proximity sensor, or a combination thereof. Optionally, in any one of the above-mentioned examples, or in another example, the device includes a first microcontroller in communication with the one or more processors, a non-transitory memory storage, and the one or more embedded sensors. Optionally, in any one of the above-mentioned examples, or in another example, receiving the signal includes determining, by the first microcontroller, that a total distance traveled by the device exceeds a total distance traveled threshold and, based thereon, signaling the intent for the location request to the one or more processors. Optionally, in any one of the above-mentioned examples, or in another example, includes determining, by the first microcontroller, that the time elapsed from the previous location request exceeds a second time threshold and, based thereon, signaling the intent for the location request to the one or more processors. Optionally, in any one of the above-mentioned examples, or in another example, the computer-implemented method further includes determining, with the one or more processors, that the device is within a user stay area and, based thereon, setting the time threshold. Optionally, in any one of the above-mentioned examples, or in another example, the computer-implemented method further includes determining, with the one or more processors, that the device is within a user stay area and, based thereon, setting the distance traveled threshold. Optionally, in any one of the above-mentioned examples, or in another example, the computer-implemented method further includes determining, with the one or more processors, that the device is not located within a user stay area and, based thereon, setting the time threshold. Optionally, in any one of the above-mentioned examples, or in another example, the computer-implemented method further includes determining, with the one or more processors, that the device is not located within a user stay area and, based thereon, setting the distance threshold. Optionally, in any one of the above-mentioned examples, or in another example, the computer-implemented method further includes determining, with the one or more processors, that the change in the user activity corresponds to one of a still movement type, a slow movement type, or a fast movement type of the device and, based thereon, setting the time threshold. Optionally, in any one of the above-mentioned examples, or in another example, the computer-implemented method further includes determining, with the one or more processors, that the change in the user activity corresponds to one of a still movement type, a slow movement type, or a fast movement type of the device and, based thereon, setting the distance threshold. Optionally, in any one of the above-mentioned examples, or in another example, the device includes a second microcontroller in communication with the one or more processors and a non-transitory memory storage. Optionally, in any one of the above-mentioned examples, or in another example, receiving the second signal includes determining, by the second microcontroller, that the device is located within a user stay area, determining, by the second microcontroller, the change in the Cell-ID, determining, by the second microcontroller, that the change in the user activity since a last Cell-ID change is a slow movement type or a fast movement type, and signaling the intent for the location request to the one or more processors. Optionally, in any one of the above-mentioned examples, or in another example, receiving the second signal includes determining, by the second microcontroller, that the device is not located within a user stay area, determining, by the second microcontroller, the change in the Cell-ID, determining, by the second microcontroller, that the change in the user activity since a last Cell-ID change is a still movement type or a slow movement type, and signaling the intent for the location request to the one or more processors. Optionally, in any one of the above-mentioned examples, or in another example, receiving the second signal includes determining, by the second microcontroller, that a time elapsed since a last Cell-ID change exceeds a third time threshold, determining, by the second microcontroller, that the device is located within a user stay area, determining, by the second microcontroller, that the change in the user activity since the last Cell-ID change is a slow movement type or fast movement type, and signaling the intent for the location request to the one or more processors. Optionally, in any one of the above-mentioned examples, or in another example, receiving the second signal includes determining, by the second microcontroller, that a time elapsed since a last Cell-ID change exceeds a third time threshold, determining, by the second microcontroller, that the device is not located within a user stay area, and signaling the intent for the location request to the one or more processors. Optionally, in any one of the above-mentioned examples, or in another example, the computer-implemented method further includes receiving, with the one or more processors, a timeline service signal indicating that the device is entering a user stay area. Optionally, in any one of the above-mentioned examples, or in another example, the computer-implemented method further includes signaling, with the one or more processors, an indication to the first microcontroller including the distance traveled threshold, the second time threshold, and that the device is entering a user stay area. Optionally, in any one of the above-mentioned examples, or in another example, the computer-implemented method further includes receiving, with the one or more processors, a timeline service signal indicating that the device is exiting a user stay area. Optionally, in any one of the above-mentioned examples, or in another example, the computer-implemented method further includes signaling, with the one or more processors, an indication to the first microcontroller including the distance traveled threshold, the second time threshold, and that the device is exiting a user stay area. Optionally, in any one of the above-mentioned examples, or in another example, requesting a location coordinate of the device includes determining that the device is connected to an active network location provider, determining that an accuracy of the location coordinates provided by the network location provider exceeds an accuracy threshold, and collecting the location coordinate of the device using the network location provider. Optionally, in any one of the above-mentioned examples, or in another example, requesting a location coordinate of the device includes determining that the device is connected to an active network location provider, determining that an accuracy of the location coordinates provided by the network location provider is less than an accuracy threshold, and collecting the location coordinate of the device using global positioning satellite signals. Optionally, in any one of the above-mentioned examples, or in another example, requesting a location coordinate of the device includes determining that the device is not connected to an active network location provider and collecting the location coordinates of the device using global positioning satellite signals. Optionally, in any one of the above-mentioned examples, or in another example, requesting a location coordinate of the device further includes recording a timestamp corresponding to the collecting the location coordinate of the device.

In accordance with yet another embodiment, a device for location sensing is provided. The device includes one or more embedded sensors configured to detect a change in a user's activity, a non-transitory memory storage including instructions, and one or more processors in communication with the non-transitory memory storage and the one or more embedded sensors. The one or more processors execute the instructions to collect a current location coordinate of the device, calculate a distance from the current location coordinate and a center point corresponding with a user stay area, calculate a time elapsed from the collecting the current location coordinate and a time corresponding to a previous location collection, and determine a user stay area status in accordance with the distance or the time elapsed. In one example, the device further includes a global positioning satellite (GPS) module configured to collect the current location coordinate of the device. Optionally, in such an example, or in another example, the device further includes a network location provider (NLP) module configured to collect the current location coordinate of the device. Optionally, in any one of the above-mentioned examples, or in another example, the one or more embedded sensors is selected from the group consisting of an accelerometer, a gyroscope, a magnetic sensor, a modem, a proximity sensor, and combinations thereof. Optionally, in any one of the above-mentioned examples, or in another example, the one or more embedded sensors includes at least one of an accelerometer, a gyroscope, a magnetic sensor, a modem, or a proximity sensor, or a combination thereof. Optionally, in any one of the above-mentioned examples, or in another example, calculating the distance from the current location coordinate and the center point corresponding with the user stay area of the device includes determining that a latitude coordinate of the current location coordinate is located between +60 degree and −60 degree latitudes, calculating a latitude difference and a longitude difference between the current location coordinate and the center point corresponding with the user stay area, and calculating the distance in accordance with the latitude difference and the longitude difference. Optionally, in any one of the above-mentioned examples, or in another example, the one or more processors execute the instructions to associate a Wi-Fi connection with a user stay area, detect a change in a stay area status of the device, and update the user stay area status using a timestamp associated with the change in the stay area status of the device. Optionally, in any one of the above-mentioned examples, or in another example, the one or more processors execute the instructions to determine a change in an activity of the device and update the user stay area status using a timestamp associated with the change in the activity of the device. Optionally, in any one of the above-mentioned examples, or in another example, determining the user stay area status in accordance with the distance includes determining that the distance exceeds a distance threshold and, based thereon, signaling that the device is no longer in the user stay area. Optionally, in any one of the above-mentioned examples, or in another example, determining the user stay area status in accordance with the time elapsed includes determining that the time elapsed exceeds a time interval threshold and, based thereon, updating the center point corresponding with the user stay area. Optionally, in any one of the above-mentioned examples, or in another example, the one or more processors execute the instructions to calculate the center point corresponding with a user stay area, the calculating the center point includes organizing a cluster of points associated with the user stay area into a plurality of sets in accordance with a respective collection source, calculating a center point for each set in the plurality of sets, setting a weight factor to each center point, and calculating the center point in accordance with the each center point weight factor and the calculated center point for each set.

In accordance with another embodiment, a computer-implemented method for a timeline service in a device is provided. The computer-implemented method includes collecting, with one or more processors, a current location coordinate, calculating, with the one or more processors, a distance from the current location coordinate and a center point corresponding with a user stay area, calculating, with the one or more processors, a time elapsed from the collecting the current location coordinate and a time corresponding to a previous location collection, and determining, with the one or more processors, a user stay area status in accordance with the distance or the time elapsed. In one example, the device includes a global positioning satellite (GPS) module used to collect the current location coordinate of the device. Optionally, in such an example, or in another example, the device includes a network location provider (NLP) module used to collect the current location coordinate of the device. Optionally, in any one of the above-mentioned examples, or in another example, the device includes one or more embedded sensors used to detect a change in a user's activity. Optionally, in any one of the above-mentioned examples, or in another example, the one or more embedded sensors is selected from the group consisting of an accelerometer, a gyroscope, a magnetic sensor, a modem, a proximity sensor, and combinations thereof. Optionally, in any one of the above-mentioned examples, or in another example, the one or more embedded sensors includes at least one of an accelerometer, a gyroscope, a magnetic sensor, a modem, or a proximity sensor, or a combination thereof. Optionally, in any one of the above-mentioned examples, or in another example, calculating the distance from the current location coordinate and the center point corresponding with the user stay area of the device includes determining that a latitude coordinate of the current location coordinate is located between +60 degree and −60 degree latitudes, calculating a latitude difference and a longitude difference between the current location coordinate and the center point corresponding with the user stay area, and calculating the distance in accordance with the latitude difference and the longitude difference. Optionally, in any one of the above-mentioned examples, or in another example, the computer-implemented method further includes associating, with the one or more processors, a Wi-Fi connection with a user stay area, detecting, with the one or more processors, a change in a user stay area status of the device, and updating, with the one or more processors, the user stay area status using a timestamp associated with the change in the user stay area status of the device. Optionally, in any one of the above-mentioned examples, or in another example, the computer-implemented method further includes determining, with the one or more processors, a change in an activity of the device and updating, with the one or more processors, the user stay area status using a timestamp associated with the change in the activity of the device. Optionally, in any one of the above-mentioned examples, or in another example, determining the user stay area status in accordance with the distance includes determining that the distance exceeds a distance threshold and, based thereon, signaling that the device is no longer in the user stay area. Optionally, in any one of the above-mentioned examples, or in another example, determining the user stay area status in accordance with the time elapsed includes determining that the time elapsed exceeds a time interval threshold and, based thereon, updating the center point corresponding with the user stay area. Optionally, in any one of the above-mentioned examples, or in another example, the calculating the center point includes organizing, with the one or more processors, a cluster of points associated with the user stay area into a plurality of sets in accordance with a respective collection source, calculating, with the one or more processors, a center point for each set in the plurality of sets, setting, with the one or more processors, a weight factor to each center point, and calculating, with the one or more processors, the center point in accordance with the each center point weight factor and the calculated center point for each set.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 12 is a flowchart of an embodiment method for determining an optimized user stay area distance threshold and a user stay area time interval threshold;

FIG. 13 is a flowchart of an embodiment method for optimizing user activity data to reduce noise;

FIG. 14 is a flowchart of an embodiment method for refinement of a user's timeline using activity recognition data;

DETAILED DESCRIPTION OF ILLUSTRATIVE EMBODIMENTS

Figure 1:
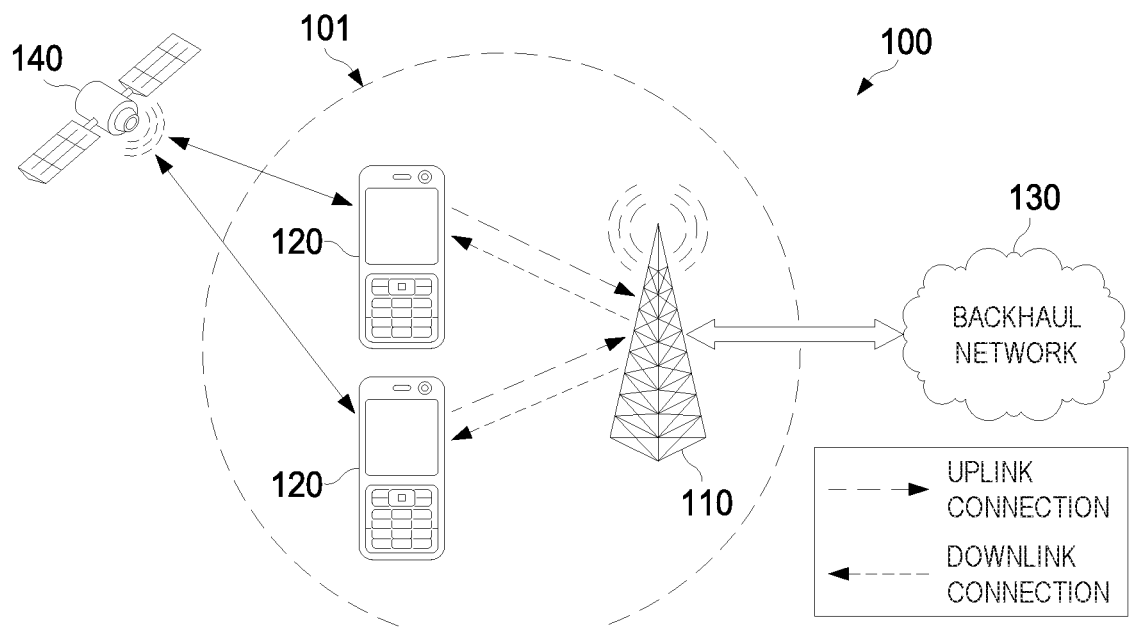
FIG. 1 is a diagram of an embodiment wireless communications network and a GPS communication network.

This disclosure provides many applicable inventive concepts that can be embodied in a wide variety of specific contexts. The specific embodiments are merely illustrative of specific configurations and do not limit the scope of the claimed embodiments. Features from different embodiments may be combined to form further embodiments unless noted otherwise.

Variations or modifications described with respect to one of the embodiments may also be applicable to other embodiments. Further, it should be understood that various changes, substitutions, and alterations can be made herein without departing from the spirit and scope of this disclosure as defined by the appended claims. While the inventive aspects are described primarily in the context of a mobile device, it should also appreciated that those inventive aspects may also be applicable to other devices that may benefit from location-aware applications, such as, smart cars, tablet devices, or smart watches.

In a host device, a location sensing service may be used to collect user location information. In general, frequent location enquiries in the host device consume valuable resources and increase network usage. In contrast, infrequent location enquiries reduce data availability for associated services. These associated services or applications use the collected data to analyze user behavior by analyzing points of interest, hobbies, habits, commute patterns, etc., and to provide suggestions for shopping, eating, traveling, etc.

Embodiments of this disclosure provide low-power and on-device (i.e., local) solutions in a location sensing service for processing location data on a host device that additionally preserves user privacy. In an embodiment, the host device leverages activity recognition data provided by embedded sensors to detect an interval of stay and a timestamp corresponding to a change in a user stay area. In these and other embodiments, the host device can advantageously detect the user stay area using data received from the embedded sensors.

Aspects of this disclosure provide embodiment methods for a location sensing service used to determine an efficient method of collecting a location of a host device in response to a change in a user stay area. In particular, aspects of this disclosure provide techniques for collecting location data using a timeline service in combination with data received from network location providers (NLPs), global positioning satellites (GPS), embedded sensors, and information passively collected from requests made by third party applications or services. In an embodiment, an adaptive location collection method based on movement patterns of the host device is proposed to control the sampling interval of location collection services by detecting changes in user activity and to signal an intent for collection of user location. In another embodiment, a heuristic algorithm based on a change in cellular identification (Cell-ID) is provided to signal a change in user location and to signal an intent for collection of the user location. The embodiment procedures described herein reduce the number of location data requests while actively monitoring changes in user location using low-power processors, embedded sensors, and changes to Cell-ID. A microcontroller in the host device sends a request to an application processor to collect location information if sufficient time has elapsed from a previous location request. In one embodiment, an application processor passively and continuously collects location information in response to requests made by third-party applications, or services, to reduce duplicate data collection. In an embodiment, the application processor selectively decides which source is to be used for collecting the location of the host device to minimize network usage and to ensure location-based accuracy.

According to various embodiments of the present disclosure, embodiment methods for a timeline service implemented in the location sensing service to detect a change in user stay area is provided. In particular, aspects of this disclosure provide techniques that improve the accuracy and efficiency for detecting a change in user stay area by utilizing information from one or more sensors, network location providers, and global positioning satellite (GPS) services. The fusion of information obtained from sensors, GPS services, Wi-Fi services, and network location provider services provide a precise, efficient, and continuous resource for detecting a change in a user stay area. Certain embodiments of the present disclosure may advantageously remove noise from a data set and provide improved methods for measuring a center point in a cluster of points, measuring distances between two points, measuring a range of a user stay area, and combining data from different sources. In some embodiments, historical stay area information is utilized to improve prediction and detection of an arrival to and/or departure from a user stay area. In other embodiments, changes in Wi-Fi status may be used to improve an arrival time or departure time of the host device corresponding to a user stay area. These and other details are discussed in greater detail below.

FIG. 1 is diagram of a network 100 for communicating data and for receiving global positioning satellite (GPS) signals. The network 100 includes a base station no having a coverage area 101, a plurality of UEs 120, and a backhaul network 130. As shown, the base station no establishes uplink (dashed line) and/or downlink (dotted line) connections with the UEs 120, which serve to carry data from the UEs 120 to the base station no and vice-versa. Data communicated over the uplink/downlink connections may include data communicated between the UEs 120, as well as data communicated to/from a remote-end (not shown) by way of the backhaul network 130. As used herein, the term "base station" refers to any network-side device configured to provide wireless access to a network, such as an enhanced Node B (eNodeB or eNB), a gNB, a transmit/receive point (TRP), a macro-cell, a femtocell, a Wi-Fi Access Point (AP), and other wirelessly enabled devices. Base stations may provide wireless access in accordance with one or more wireless communication protocols, e.g., 5th generation new radio (5G NR), LTE, LTE advanced (LTE-A), High Speed Message Access (HSPA), Wi-Fi 802.11a/b/g/n/ac, etc. As used herein, the term "UE" refers to any user-side device configured to access a network by establishing a wireless connection with a base station, such as a mobile device, a mobile station (STA), a vehicle, and other wirelessly enabled devices. In some embodiments, the network 100 may include various other wireless devices, such as relays, low power nodes, etc. While it is understood that communication systems may employ multiple access nodes capable of communicating with a number of UEs, only one base station no, and two UEs 120 are illustrated for simplicity. The network 100 includes a GPS 140 in communication with the UEs 120. The GPS 140 may transmit GPS coordinates to a respective UE 120 in accordance with the UEs 120 global positioning coordinates.

Figure 2:
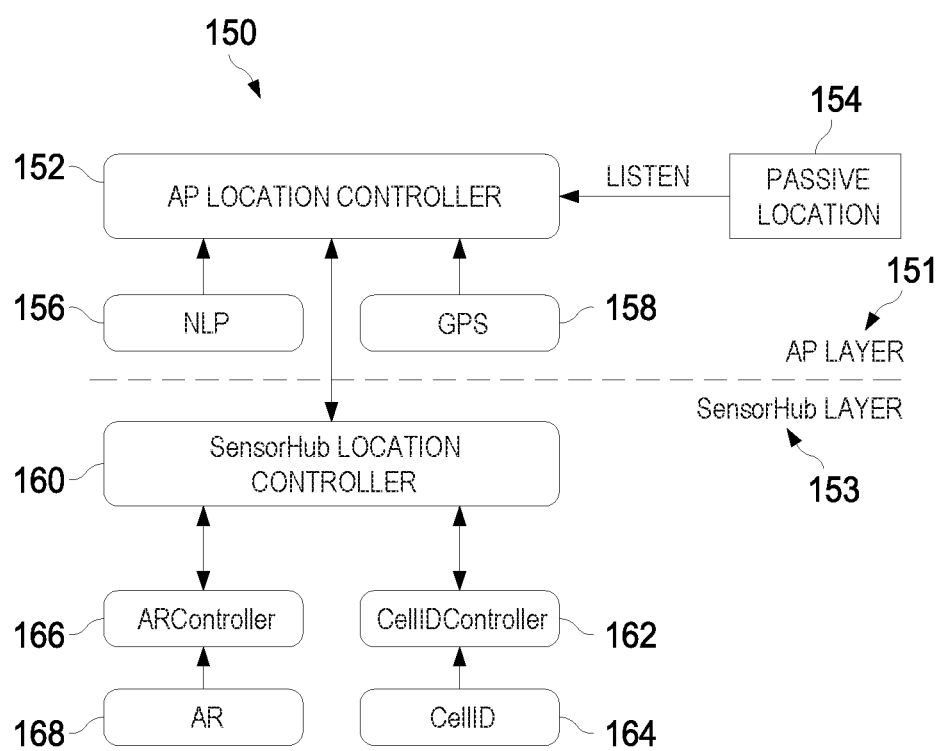
FIG. 2 is a diagram of an embodiment processing system for performing adaptive location service sampling.

FIG. 2 illustrates a block diagram of an embodiment processing system 150 for performing an adaptive location service sampling method as described herein, which may be installed in a host device. As shown, the processing system 150 may include various interconnected modules categorized as being within an application processor (AP) layer 151 or within a SensorHub layer 153. The AP layer 151 can be implemented within an application processor of the host device and may include an AP location controller module 152, a network location provider (NLP) module 156, and a global positioning satellite (GPS) module 158. The AP Location Controller module 152 of the AP layer 151 may be connected to the SensorHub Location Controller module 160 of the SensorHub Layer 153. The SensorHub layer 153 can be implemented within a low-power processor of the host device and may include a SensorHub Location Controller module 160, a Cell-Id (CID) controller module 162, a Cell-Id (CID) module 164, an activity recognition (AR) controller module 166, and a activity recognition (AR) module 168. Specific processing systems may utilize all of the components shown, or only a subset of the components, and levels of integration may vary from device to device.

In an embodiment, the SensorHub Location Controller module 160 may signal an intent to actively collect location based information to the AP Location Controller module 152. The AP Location Controller module 152, in response to receiving the intent to actively collect location based information, may determine whether or not to actively collect location information. In some embodiments, the elapsed time from a previous collection may be determined to be less than a minimum time threshold and the AP Location Controller module 152 may determine that enough time has not elapsed to collect a next location information. In some embodiments, the AP Location Controller module 152 may determine that a third party application or a service may have recently collected location-based information. The adaptive location service may advantageously take benefit from location requests made by the third party application or service to passively collect this information at a same time to reduce duplicate activity within the host device. This allows for the electronic device to reduce active requests made by the AP Location Controller 152, resulting in a reduction in network usage and processing power. In these embodiments, the AP Location Controller 152 may be configured to passively listen for location requests.

The AP Location Controller module 152 can be configured to selectively choose the collection module (i.e., NLP module 156 or GPS module 158) in accordance with an assortment of criteria. This selection may be in accordance with, for example, meeting a minimum location accuracy threshold, reducing network usage, or improving processing efficiency. As an example, the AP location Controller module 152 may determine that the signal received from the NLP module 156 may be a weak signal location based information, which does not meet an accuracy or reliability threshold. As a result, the AP Location Controller module 152 may select the GPS module 158 as the collection module. In another example, the AP location Controller module 152 may determine that the location based information provided by the NLP module 156 meets the accuracy threshold and as the NLP module 156 is less resource/power hungry than the GPS module 158, the AP location Controller module 152 may select the NLP module 156 as the collection module. In some embodiments, the GPS module 158 and/or the NLP module 156 may be connected to the SensorHUB location Controller module 160. In such an embodiment, the SensorHub Location controller 160 may make the determination of the collection module.

The SensorHub Location Controller module 160 can be implemented in a microcontroller unit (MCU) of the host device and can be configured to make a final decision to wake the AP layer 151 and proactively request a location point by the AP Location Controller module 152. The SensorHub Location Controller module 160 may send the intent to actively collect location based information to the AP Location Controller module 152 after receiving an indication from one or both of the ARController module 166 and the CellIDController module 162. The ARController module 166 may receive a signal from the AR module 168 signaling a change in user location in response to a recognition of an activity by the user of the host device. The AR controller module 166 may be used to determine the appropriate moment to send the intent of location request to the SensorHub Location Controller module 160 based on pattern changes in the user's movement.

A non-limiting list of sensors in the AR module 168 are an accelerometer, a gyroscope, a magnetic sensor, a modem, and a proximity sensor. These sensors provide the benefit of low power consumption and near continuous activity. The SensorHub Location Controller module 160 may receive a signal from the CellIDController module 162, signaling a change in a cellular identification (Cell-ID) 164 of the host device. In response to the change in the Cell-ID 164, the CellIDController module 162 may be used to determine the appropriate moment to send the intent of location request to the SensorHub Location Controller module 160, based on pattern changes in the user's Cell-ID.

Figure 3:
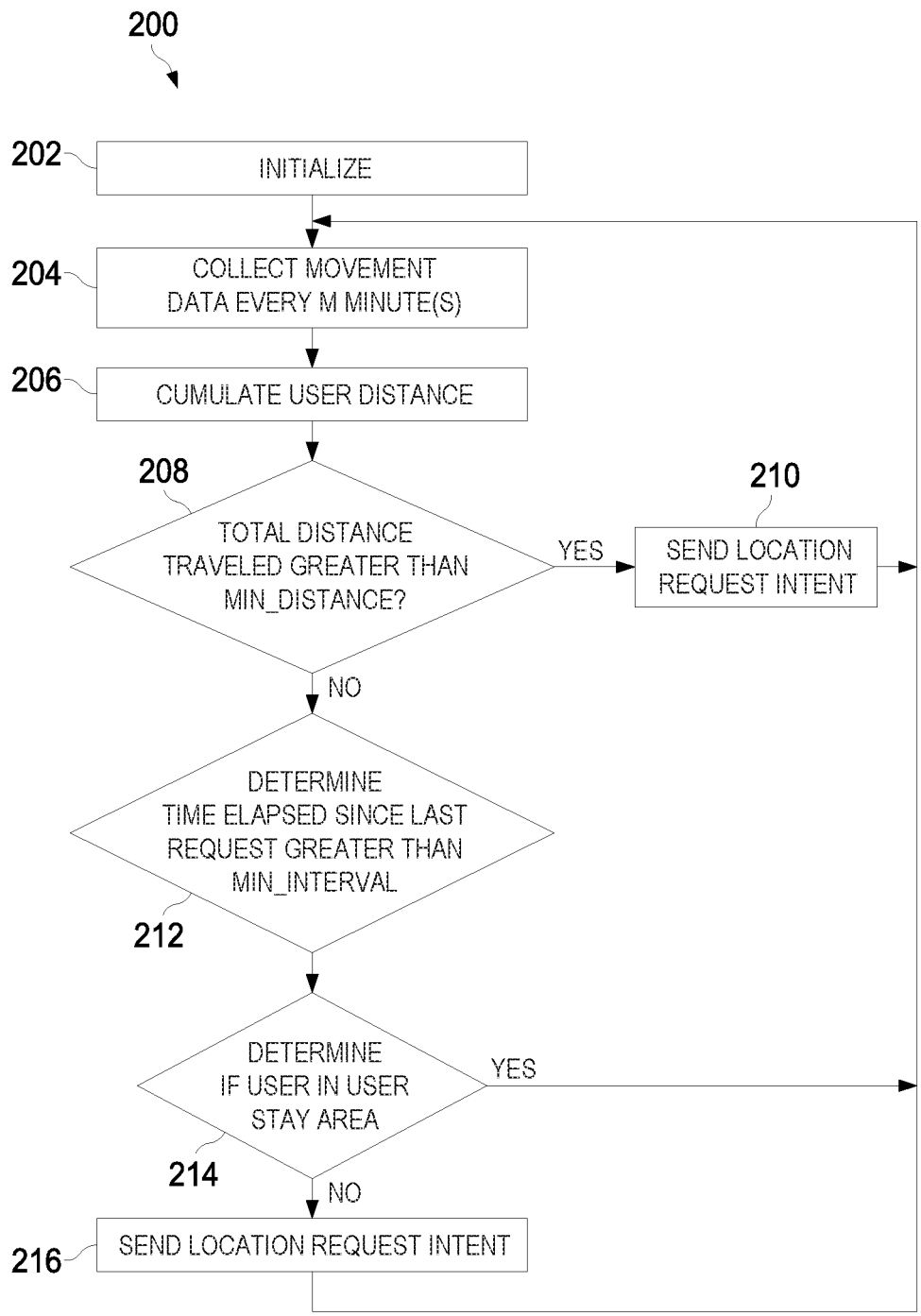
FIG. 3 is a flowchart of an embodiment method for transmitting an intent to collect location information based on user movement.

FIG. 3 is a flowchart of an embodiment method 200 for transmitting an intent to collect location information to a SensorHub Location Controller module 160 based on user movement, as may be performed by an ARController module 166 in a host device. At step 202, time-based and location-based parameters are initialized for a first time operation. As an example, at step 202, the total distance traveled by the host device is initialized to zero and the current timestamp is recorded. In addition, each of the minimum distance threshold (Min_Distance) and the minimum time interval (Min_Interval) is preset to set values, for example, retrieved from a non-transitory memory storage of the host device. In a non-limiting example, the minimum distance threshold may be two-hundred (200) meters and the minimum time interval may be five (5) minutes.

At step 204, the ARController module 166 begins to continuously detect user movement every M minutes, where M in a non-limiting example can be one (1) minute. At step 206, at M time intervals, the total distance traveled by the user, since the initialization step of 202 or since a reset of total distance traveled, is determined. As an example, if M is one (1) minute; at one (1) minute time intervals, the user's movement is converted into a distance variable. After a period of two (2) minutes, the total distance traveled in the past minute is added to the total distance traveled in the first minute to calculate the user distance traveled after two (2) minutes. This process is repeated until a trigger for distance initialization is triggered.

In some embodiments, embedded sensors and one or more processors may be used to determine user's activity type as a basis to calculate the user's total traveled distance. Sensors, such as an accelerometer or a gyroscope, with the help of low-power processor, such as a microcontroller, can detect, differentiate, and categorize user movement at any moment in time. An activity recognition engine in most modern electronic devices can be used to predict and categorize, with fairly good accuracy, user activity information from these sensors. In an example, the user's activity may be categorized, based on speed, into still, slow, or fast modes of movement. Static or still is a state where the user is not moving. Slow is a state where the user is moving at a slow speed, such as that of walking or fast walking. Fast is a state where the user is moving at a fast speed such as that of running, biking, or traveling by vehicle, airplane, or railway.

Embedded sensors are in a continuously ON state and can be valuable resources for continuous activity monitoring, calculating distance traveled, and/or for detecting a change in a user's location. In some embodiments, the user's stay area status may also be used as a basis to calculate the total user distance traveled. The user's stay area status may be determined using, for example, a timeline service. The timeline service and the activity recognition sensors may be used, for example, as an indication of a change in a user's location, whether this is leaving from or arriving to a user's stay area. Furthermore, a user's activity or a change in the user's activity may be a good indicator of a change in a user's stay area. For example, a user may remain fairly still with minimal activity at an office location, while a user in a gym may have a much higher activity rate. In the case where the activity of the user is historically with the user stay area, the host device may determine a change in a user's stay area.

A geographical area, or a cluster of location points, in which a user remains for a duration of time greater than a minimum time threshold and without exiting, can be categorized as a user's stay area. The user's stay area may also have a range characteristic, in which each location point in the cluster of location points are located within a designated range from each other. In some embodiments, the user's stay area may be located within a distance threshold from a center location point of the cluster of location points. It should be noted that a user stay area is not limited to a previously identified area or a previously visited area by the user.

Embodiments of this disclosure may advantageously determine the state of a user and make decisions to request location based service information in accordance with an identified movement category. The distance traveled can approximately be determined, for example, by using the electronic device's travelling speed. The travelling speed can be approximated using one or more low-power sensors in the electronic device, such as an accelerometer, magnetic compass, etc. The timeline service may be used to determine whether or not a user is in a user stay area and to determine the duration that that user is located within the user stay area. If the timeline service does not have enough historical location points to make a determination of whether a user is currently in a user stay area or not, the timeline service by default may assume that the user is NOT in a user stay area—this is typical of an initial state of the timeline service. In the case where previous location information is available, the timeline service may use previous location points to determine whether a user in a user stay area.

In some embodiments, if the timeline service determines that a user is not in a user stay area, the total distance traveled by the user categorized as slow at M time intervals, is used as the total distance traveled by the user. Otherwise, the distance traveled by the user within any activity category may be used as the total distance traveled. The distance traveled at each M interval, by the ARController module 166, may be calculated by multiplying the length of time (M) with a speed of the user. These values are accumulated to calculate the total distance traveled by the host device over the last M minutes without a reset.

At step 208, the ARcontroller module 166 determines whether the total distance traveled by the user collected in step 204 is greater or less than a predetermined minimum distance threshold (Min_Distance). The minimum distance threshold may be two-hundred (200) meters in some examples and is selected during the initialization step of 202. At step 210, if the user is determined to have traveled a distance greater than the minimum distance threshold, the ARController module 166 may send an intent for a location request to the SensorHub Location Controller module 160. The current timestamp is also recorded and the total distance traveled value is reset. The process returns to step 204 and is repeated.

At step 212, in the event that the total distance traveled by the user calculated at step 206 is less than the minimum threshold, the ARController module 166 determines whether the time elapsed from a previous location request is greater or less than a minimum time interval (Min_Interval). The minimum time interval may be five (5) minutes in some examples and may be selected during the initialization step of 202.

In the case where it is determined that the time elapsed since a reset of the time-based and location parameters are greater than the minimum time interval, at step 214, the ARController module 166 determines if the user is in a user stay area using the timeline service. If the ARController module 166 determines the user is in a user stay area, the current timestamp is recorded, the total distance traveled is reset, and the process returns to step 204 without sending an intent for a location request to the SensorHub Location Controller module 160. The process is repeated.

In the event that the time elapsed since initialization is greater than the minimum time interval, at step 216, the ARController module 166 sends an intent for a location request to the SensorHub Location Controller module 160. The current timestamp is also recorded and the total distance traveled by the host device is reset. The process returns to step 204 and is repeated.

Figure 4:
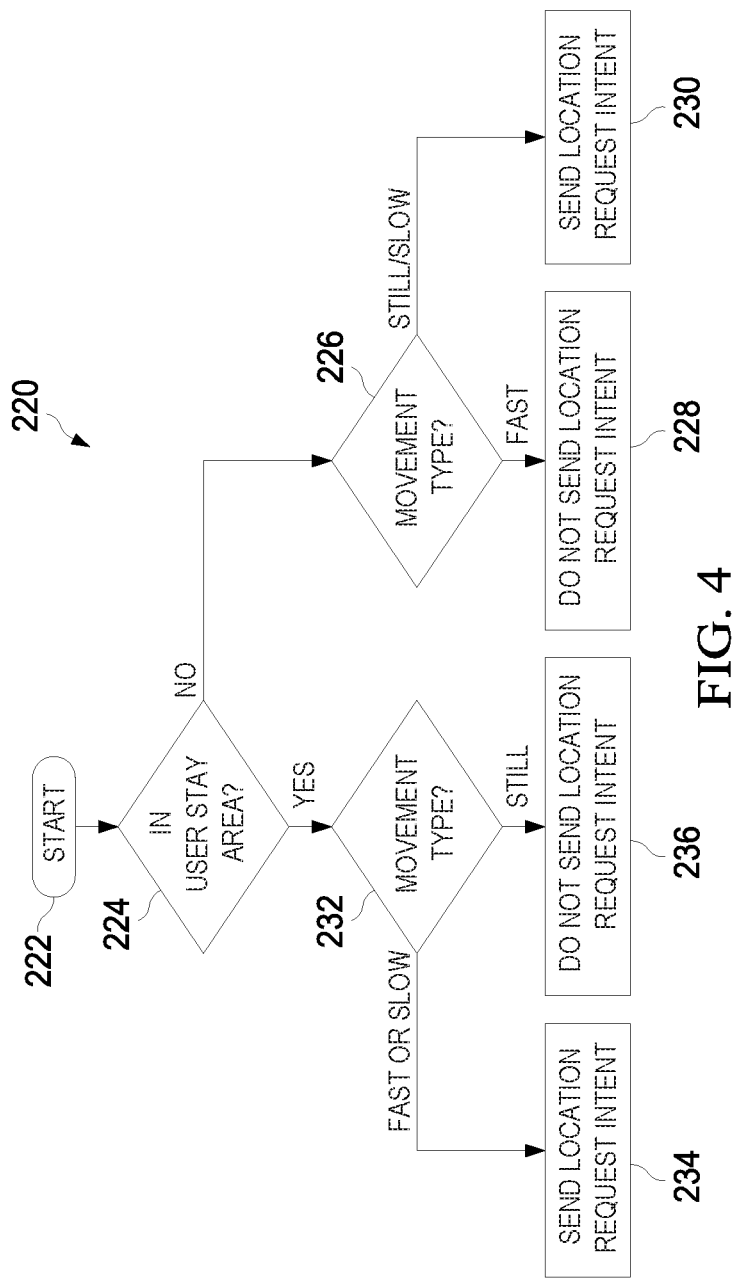
FIG. 4 is a flowchart of another embodiment method for transmitting an intent to collect location information based on user movement.

FIG. 4 is a flowchart of another embodiment method 220 for transmitting an intent to collect location information to a SensorHub Location Controller module 160 based on user movement, as may be performed by an ARController module 166 in a host device. The adaptive location service as described using FIG. 4 is used to determine the appropriate time interval to send the location request intent in accordance with the user stay area status and the movement type.

At step 222, the embodiment method 220 is initialized for a first time and the requisite parameters are initialized for a first time use. At step 224, the ARController module 166 determines whether or not the user is currently in a user stay area. If the timeline service does not have enough historical location points to make a determination of whether a user is currently in a user stay area or not, the timeline service by default assumes that the user is NOT in a user stay area—this is typical of an initial state of the timeline service. In general, if previous location information is available, the timeline service may use the previous location points to determine whether a user in a user stay area.

At step 226, if it is determined that the user is not currently in a user stay area, the movement type of the user is used to determine time intervals to submit a location request intent to the AP location Controller module 152. At step 228, if it is determined that the movement type is a fast movement type, the location request intent is not sent. However, if it is determined that the movement type is a still or slow movement type, at step 230, the location request intent is sent at a determined time interval.

At step 232, if it is determined that the user is currently in a user stay area, the movement type of the user is used to determine time intervals to submit a location request intent to the AP Location Controller module 152. At step 234, if it is determined that the movement type is a fast or slow movement type, the location request intent is sent at a third determined time interval. If it is determined that the movement type is still, at step 236, the location request intent is not sent as the user is not moving and therefore there is no possibility that the user is exiting a user stay area.

In some embodiments, the distance threshold and the time threshold can be set differently in accordance with the user stay status. As an example, in an embodiment where the user is within a user stay area, the distance threshold may be set to sixty (60) meters and the time interval threshold may be set to one (1) hour. However, in an embodiment where the user is not in a user stay area, the distance threshold may be set to three-hundred (300) meters and the time interval threshold may be set to five (5) minutes.

As an example, a host device is in fast mode and the user is determined to currently be located within user stay area, the total distance traveled based on the speed of the device at intervals of, for example, one (1) minute is collected and aggregated until a distance threshold, for example, one (1) km is met at which point the location request intent is transmitted. The total distance traveled at each interval is measured by accumulating a multiplication of a speed of each movement type (e.g., running, walking, etc.) by the length of time spent at that speed within the interval. As an example, if the user, within the one (1) minute, spends thirty (30) seconds running and thirty (30) seconds walking, the total distance traveled is equal to the running speed multiplied by 30 seconds added to the walking speed multiplied by 30 seconds. The embodiment methods 200 220 provide strategies for requesting a location as soon as possible, as the user is more likely to be leaving the user stay area. In another example, a host device is in fast mode and the user is determined to currently not be located within a user stay area. As the user is not in a user stay area, the total distance traveled by the user uses user activity related to slow movements. The speed of the device at intervals of, for example, one (1) minute is collected and aggregated until a distance threshold, for example, one (1) km is met at which point the location request intent is transmitted. The embodiment methods 200 220 provide strategies for requesting a location periodically and at shorter time intervals than in the previous example. In another example, a host device is in still mode and the user is determined to currently be located within a user stay area, the embodiment methods 200 220 provide strategies for not requesting a user's location. In yet another example, a host device is in still mode and the user is determined to currently be located outside a user stay area, the embodiment methods 200 220 provide strategies for periodically requesting location information, for example, every five (5) minutes. In another example, a host device is in slow mode, the location request is made in accordance with the distance traveled in slow mode, for example, a location request may be made if the distance traveled in slow mode exceeds a distance threshold. In an embodiment, the distance threshold may be set to sixty (60) meters when a user is in a user stay area and the host device is in fast mode. In this embodiment, the location request is performed more frequently until the timeline service determines that the host device is no longer in a user stay area. Upon determining that the host device is no longer in a user stay area, the distance threshold may be set to three-hundred (300) meters.

In an embodiment, a user in a static state within an office building may begin a timeline service at 9 am. The timeline service, lacking adequate location information, is unable to determine whether or not the user is in a user stay area. The timeline service will then assume that the user is not in a user stay area and begins to collect the distance traveled every minute until the cumulative distance traveled is greater than sixty (60) meters. However, as the user is in a static state, the total distance traveled is near zero. The timeline service will attempt to collect at least three (3) location points within a fifteen (15) minute period and determine, based on the three location points, if the user is in a user stay area. This determination is then sent to the adaptive location collection service. While the user remains stationary in the determined user stay area, the timeline service will not request for any additional location points. However, in response to the user changing to a slow mode, the timeline service will begin to collect the distance traveled by the user every minute until the user has traveled a distance greater than sixty (60) meters at which point the timeline service will send the location request intent to the adaptive location collection, which is then repeated until the timeline service determines whether the user has exited the user stay area. In response to determining that the user has exited the user stay area, the timeline service sends the determination to the adaptive location collection service.

Figure 5:
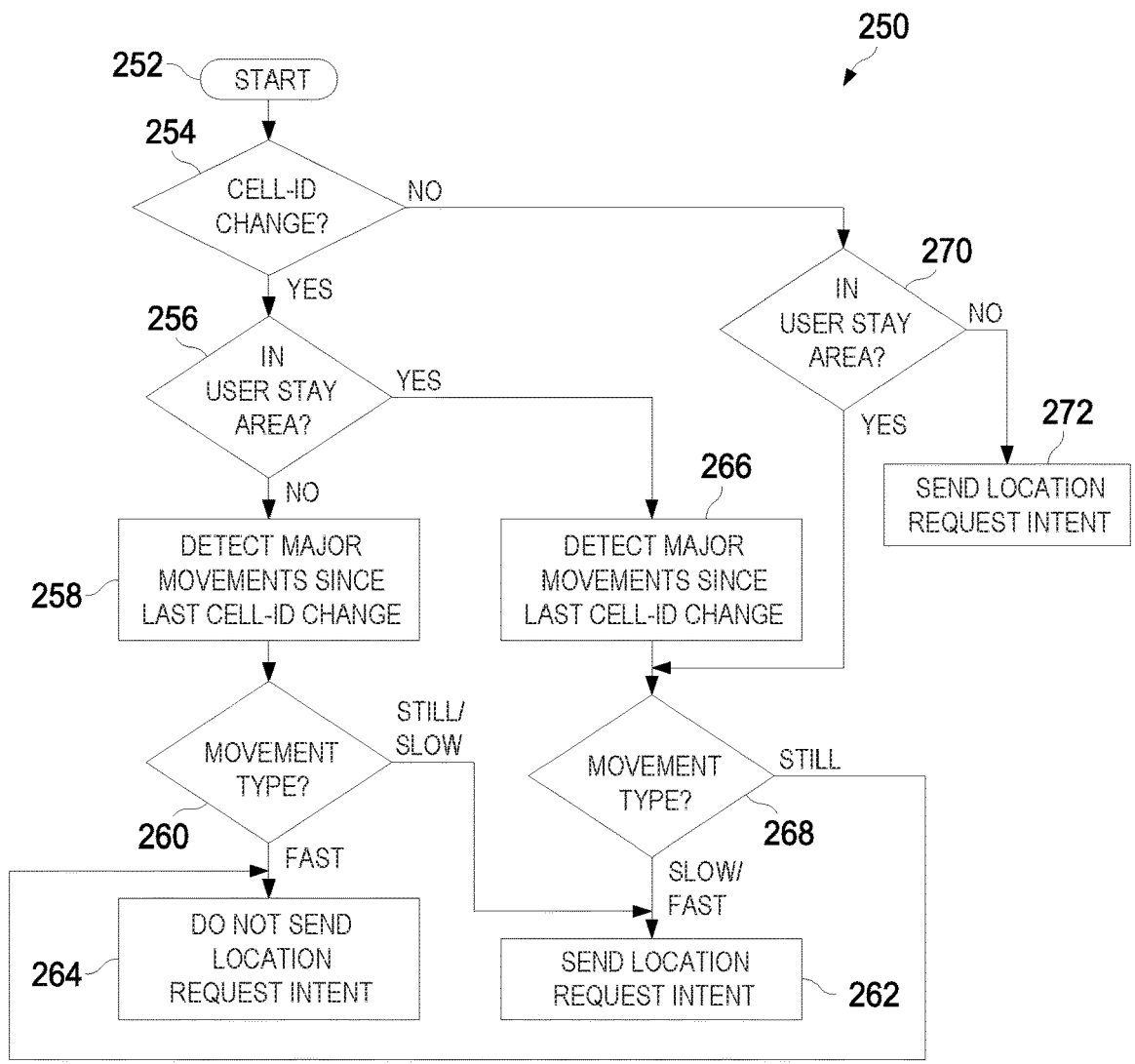
FIG. 5 is a flowchart of an embodiment method for transmitting an intent to collect location information based on a cell-ID change.

FIG. 5 is a flowchart of an embodiment method 250 for transmitting an intent to collect location information to a SensorHub Location Controller module 160 based on a cell-ID change, as may be performed by a CellIDController module 162 in a host device. Generally, a device travelling within a coverage area of a cellular network, with multiple base stations, may connect and disconnect to the one or more base stations in accordance with the relative location of the device to the base station. As each base station is equipped with a unique Cell-ID, at any given moment the device is connected to a unique Cell-ID. A cellular network may also be served by multiple small base stations or alternatively by one large base station. In these embodiment, regardless of the movement type of the electronic device, a change in Cell-ID can provide valuable information for location based sensing. At step 252, the embodiment method 250 is initialized for a first time and the requisite parameters are initialized for a first time use.

At step 254, the CellIDController module 162 listens for a change in Cell-ID. At step 256, in response to determining a change in Cell-ID, the status of the user stay area is determined. At step 258, in response to determining that the user is NOT in a user stay area, major movements since last Cell-ID change are queried. At step 260, the electronic device determines the movement type from the previous Cell-ID change. At step 262, if the major movements since last Cell-ID change are of the still or slow variety, a location request intent is generated by the CellIDcontroller module 162 and sent to the SensorHub Location Controller module 160. However, if the major movements since last Cell-ID change are of the fast variety, at step 264, NO location request intent is generated.

At step 266, in response to determining that the user is in a user stay area, major movements since last Cell-ID change are queried and at step 268, the electronic device determines the movement type since a last Cell-ID change. At step 264, if it is determined that no movement is detected since the last Cell-ID change, NO location request intent is generated. Alternatively, at step 262, in response to determining that the major movements since last Cell-ID change is of the slow or fast variety, a location request intent is generated by the Cell-ID controller and sent to the SensorHub Location Controller module 160.

At step 270, in response to not receiving an indication of a Cell-ID change within an allotted time, greater than a time interval threshold, the status of the user stay area is determined. At step 268, in response to the user being in a user stay area, the movement type of the host device is determined and at step 264, if the electronic device has not moved since last Cell-ID change, NO location request intent is generated. Alternatively, at step 262, in response to determining that the major movements since last Cell-ID change is of the slow or fast variety, a location request intent is generated by the CellIDController module 162 and sent to the SensorHub Location Controller module 160. At step 272, in response to determining that the user is NOT in a user stay area, regardless of movement type, a location request intent is generated by the CellIDController module 162 and sent to the SensorHub Location Controller module 160.

Figure 6:
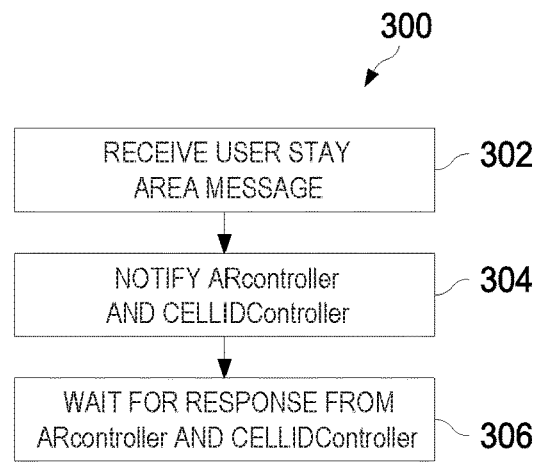
FIG. 6 is a flowchart of an embodiment method for determining a request for a location coordinate.

FIG. 6 is a flowchart of an embodiment method 300 for determining whether or not to send a location request to an AP Location Controller module 152, as may be performed by a SensorHub Location Controller module 160 in a host device. At step 302, the SensorHub Location Controller module 160 receives a message from a Timeline service application. The message may be an Entering Message or an Exiting Message. An Entering Message is a message in response to the host device entering a user stay area. An Exiting Message is a message in response to the host device exiting a user stay area and moving to another user stay area. If the message is an Entering Message, there is a possibility that the host device may leave the user stay area at any time or remain within the user stay area for a period of time. If the message is an Exiting Message, there is a possibility that the host device may travel a long time before reaching the next user stay area or that it might be entering the next user stay area at any time.

At step 304 and in response to receiving an Entering Message from the timeline service application, the SensorHub Location Controller module 160 notifies the ARController module 166 and the CellIDController module 162 that the host device has entered a user stay area and to adjust the Min_Distance and Min_Interval parameters. In a non-limiting example, the Min_Distance value can be set to sixty (60) meters and the Min_Interval value can be set to one (1) hour.

Alternatively, at step 304 and in response to receiving an Exiting Message from the timeline service application, the SensorHub Location Controller module 160 notifies the ARController module 166 and the CellIDController module 162 that the host device has exited the previous user stay area and to adjust the Min_Distance and Min_Interval parameters accordingly. In a non-limiting example, the Min_Distance value can be set to two-hundred (200) meters and the Min_Interval value can be set to five (5) minutes.

At step 306, in response to the SensorHub Location Controller module 160 notifying the ARController module 166 and the CellIDController module 162 with an Exiting Message or an Entering Message, the SensorHub Location Controller module 160 may receive in return a location request intent. If the SensorHub Location Controller module 160 receives a location request intent, the time elapsed since the last location point collection is compared to a time threshold, for example, five (5) minutes. If the time elapsed is greater than the time threshold, the AP layer 151 is woken and a location request is sent to the AP Location Controller module 152.

Figure 7:
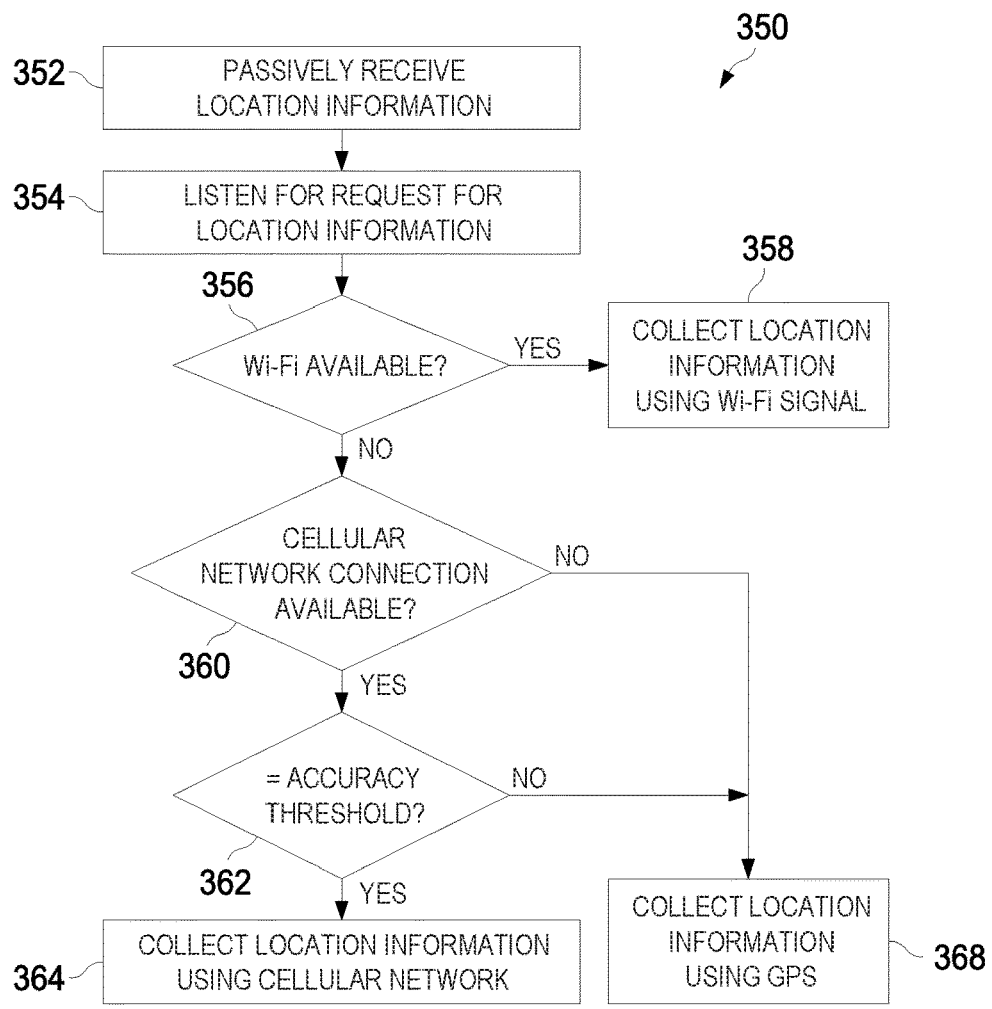
FIG. 7 is a flowchart of an embodiment method for collecting a location coordinate.

FIG. 7 is a flowchart of an embodiment method 350 for collecting a location information, as may be performed by an AP Location Controller module 152 in a host device. In some embodiments, the AP Location Controller module 152 may be responsible for deciding the source to collect the location information of the host device. The selection of the source may be decided based on low power consumption and/or low network usage. At step 352, the AP Location Controller module 152 passively collects location information as a result of a request from third-party applications or other services. As an example, a map guidance application installed on the host device may collect location information to provide a user of the electronic device accurate navigation guidance. In this example, the location information is passively collected without making an active location request.

At step 354, the AP Location Controller module 152 receives a request from the StubHub Location Controller module 160 that actively requests the current location of the host device. At step 356, the AP Location Controller module 152, in response to receiving the message, initially checks for Wi-Fi availability at the host device. At step 358, in response to determining the availability of Wi-Fi services, the source for collecting location information is determined to be a Wi-Fi signal.

At step 360, in response to determining that the electronic device does not have Wi-Fi availability, the availability of a cellular network is determined. At step 362, in response to determining that the electronic device has an available cellular network connection, the accuracy of the location information from the network connection is gauged. At step 364, in response to determining that the location information accuracy collected from the cellular network meets or exceeds an accuracy threshold, for example five-hundred fifty (550) meters, the AP Location Controller module 152 collects the location information using the cellular network connection.

At step 368, in response to determining that the host device does not have cellular network connection availability at step 360 or that the location information accuracy collected from the cellular network does not meet an accuracy threshold at step 362, the AP Location Controller module 152 collects the location information using the GPS service. After the AP Location Controller module 152 collects location information, the corresponding timestamp is passed to the SensorHub Location Controller module 160.

Figure 8:
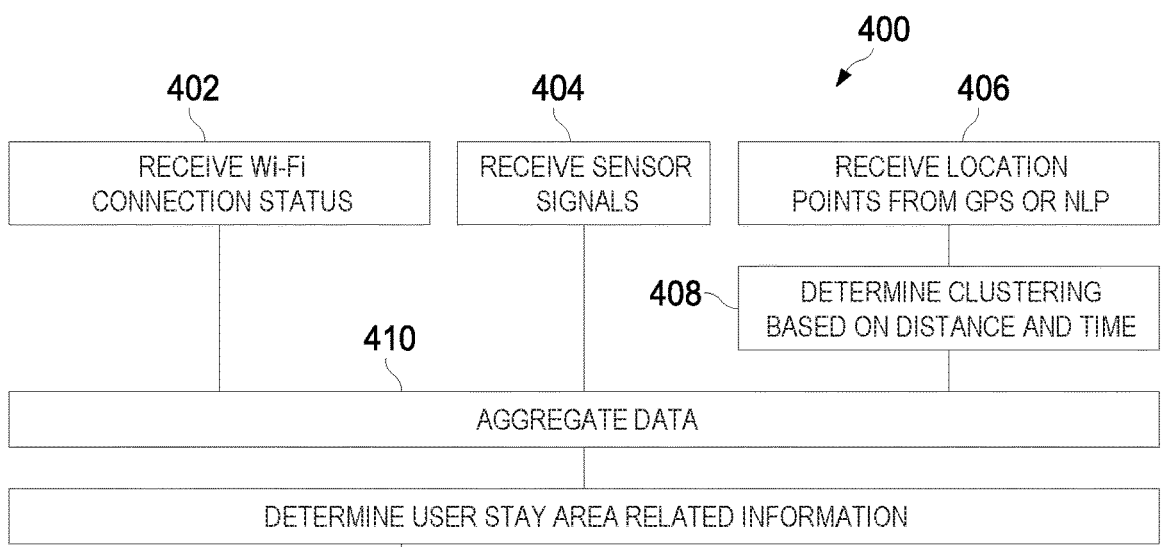
FIG. 8 is a flowchart of an embodiment method for detecting user stay area information based on multimodal sensing.

FIG. 8 is a flowchart of an embodiment method 400 for detecting user stay area information based on multimodal sensing, as may be performed by a timeline service application in a host device. At step 402, the timeline service may receive information related to the Wi-Fi connection status of the host device. In some embodiments, the information may be a timestamp corresponding with a successful connection with a Wi-Fi signal. In some embodiments, the information may be a timestamp corresponding with a successful disconnect with the Wi-Fi signal. These and other embodiments related to the Wi-Fi connection status information are discussed further in FIG. 16.

At step 404, the timeline service may receive information related to the user activity of the host device. In some embodiments, an activity recognition engine implemented in a microcontroller and connected with embedded sensors may detect a change in user activity. In these embodiments, the signal may be a timestamp corresponding to a change in user activity may. In one embodiment, the signal may indicate a type of activity performed by the user of the host device. In another embodiment, the signal may indicate a change in activity type corresponding to a change of activity location. These and other embodiments are discussed further in FIG. 14.

At step 406, the timeline service may receive information related to a user's location using a GPS signal or a network location provider. The data received from the GPS signal or the network location provider may have different accuracies depending on the reliability of the signal. In some embodiments both signals are used as inputs to the timeline service, while in some embodiments one of the signals is used as an input to the timeline service. At step 408, a real-time user stay area clustering analysis is performed on the data received from one or both of the GPS signal and the network location provider signal based on distance and time information. These and other embodiments are discussed further in FIG. 9.

At step 410, the timeline service aggregates the data received from one or more of the steps 402, 404, and 406 providing a multimodal set of data used in determining user stay area related information of the host device at step 410. In some embodiments, the timeline service uses a fusion algorithm to adaptively determine a user's stay area information, for example, range of area and/or length of time located within the user stay area. In some embodiments, a smoothing algorithm is used to remove noise in the signals received. These and other embodiments are discussed further in FIG. 13.

Figure 9:
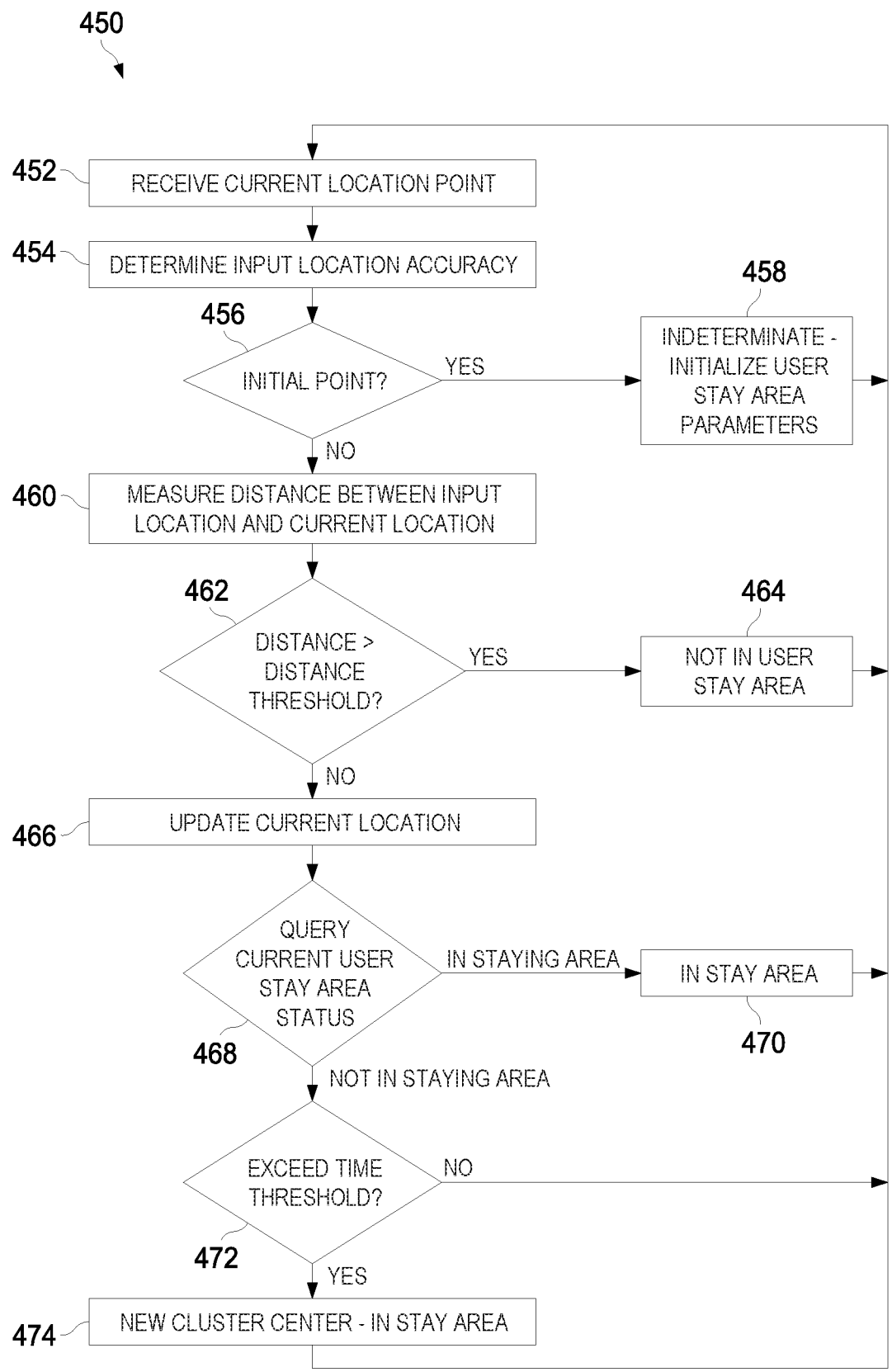
FIG. 9 is a flowchart of an embodiment method for detecting a user stay area status using a GPS signal or a network location provider signal.

FIG. 9 is a flowchart of an embodiment method 450 for detecting a user stay area status using a GPS signal or a network location provider signal information, as may be performed by a timeline service application in a processor of a host device. As illustrated, the timeline service determines the current user stay area status of the host device in accordance with a current location point and an existing user stay area status. At step 452, the current location coordinates of the host device is determined using, for example, a GPS module 158 or a network location provider module 156. The selection of the collection source may be to minimize network usage by the host device, minimize processing requirements, or to meet a minimum location accuracy threshold. The current location coordinates, current timestamp, and the collection source are recorded in a computer-readable non-transitory media of the host device.

At step 454, the accuracy of the input location parameter is measured against an accuracy threshold. Generally, accuracy of the location point information collected by the GPS or the network location provider modules may vary, owing to point drift, signal blockage due to buildings, bridges, trees, and the like. The disregarding of inaccurate location point information may help to improve user stay area accuracy. If the input location does not meet the accuracy threshold, the input parameter is ignored and the timeline service returns to step 452 to receive a next input location. This process is repeated until an accurate input location is been collected.

At step 456, the timeline service application determines whether or not the location point collected at step 452 is an initial location point collected by the timeline service. In some embodiments, the timeline service may have a current user stay area status and corresponding information such as a center location point coordinate, a range of location points visited by the host device, and/or a period of time in which the host device has remained within the current user stay area. However, in some embodiments, the timeline service may not have a current user stay area status and the current location point collected at step 452 may be the first location point collected by the timeline service. In such embodiments, at step 458, the current user stay area status of the host device is categorized as to be NOT in a user stay area. The current location point coordinates and the corresponding time stamp are stored for a next timeline service routine. As additional location points are collected, the timeline service may determine a user stay area and a user stay area status for the electronic device.

The current location is calculated based on the input location. At step 460, the timeline service calculates the distance between the input location and the current location. Methods for calculating the distance between two location points are further discussed in FIG. 10. Methods for calculating the center location point of a user stay area are further discussed in FIG. 11.

At step 462, the timeline service determines whether the distance calculated at step 460 is greater or less than a user stay area distance threshold. If the distance calculated is greater than the user stay area distance threshold, at step 464, the timeline service determines that the updated location of the host device must be outside the user stay area, as the distance from the center point of the user stay area exceeds the user stay area distance threshold, irrespective of the user previously being in or outside of a user stay area. However, if the distance calculated is less than the user stay area distance threshold, at step 466, the timeline service updates the current location of the user stay area. The updated longitudinal and latitudinal coordinates of the current location of the user stay area is equal to the total number of location points multiplied by the previous current location, which is then divided by (1+the total number of location points), respectively for each of the latitude and longitude coordinates. Methods for determining a user stay area distance threshold are further discussed in FIG. 12.

At step 468, the timeline service determines whether the current user area status of the host device is indicating that the host device is located inside or outside of a user stay area. If the timeline service determines that the current user stay area status is inside a user stay area, as the distance calculated at step 462 is less than the user stay area distance threshold, and at step 470 the timeline service determines that the host device is remaining within the user stay area and returns to step 452. However, if the current user stay area status is determined to be outside a user stay area, at step 472, in order to determine if the current user stay area is a new user stay area, the timeline service determines whether the elapsed time from a previous location point collection exceeds a user stay area time interval threshold. Methods for determining a user stay area time interval threshold are further discussed in FIG. 12.

At step 474, if the elapsed time is determined to be greater than the user stay area time interval threshold, the timeline service determines that the host device is entering a new user stay area and returns to step 452. The cluster center is updated to the current location. Otherwise, the timeline service returns to step 452 without making any changes to the user stay area status.

The embodiment method 450 provides a cluster of points for multiple user stay areas, each having a center location point, a corresponding range for the cluster of points within each user stay area, and a time interval in which the host device remained within each user stay area.

Figure 10:
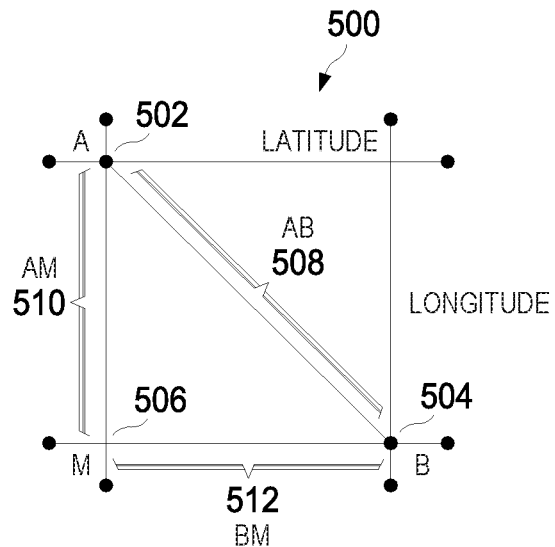
FIG. 10 is a diagram used to illustrate an embodiment method for calculating a distance between two points.

FIG. 10 is a simplified diagram 500 used to illustrate an embodiment method for calculating the distance (AB 508) between coordinate locations points A 502 and B 504. Generally, to calculate the distance (d) between two points ($\emptyset_1$ being the latitude of point 1, $\emptyset_2$ being the latitude of point 2 in radians, $\lambda_1$ being the longitude of point 1, and $\lambda_2$ being the longitude of point 2 in radians) on a sphere with a radius (r), the haversine formula is used:

$$hav\left(\frac{d}{r}\right) = hav(\emptyset_2 - \emptyset_1) + \cos(\emptyset_1) \times \cos(\emptyset_2) \times hav(\lambda_2 - \lambda_1),$$

where $$hav(\theta) = \sin^2\left(\frac{\theta}{2}\right) = \frac{1 - \cos(\emptyset)}{2}$$

Solving for distance (d) by applying the inverse haversine:

$$d = 2 \times r \times \arcsin\left(\sqrt{\sin^2\left(\frac{\emptyset_2 - \emptyset_1}{2}\right) + \cos(\emptyset_1) \times \cos(\emptyset_2) \times \sin^2\left(\frac{\lambda_2 - \lambda_1}{2}\right)}\right)$$

It can be deduced from the above that each distance calculation includes multiple trigonometric calculations. It is therefore advantageous to provide a method that reduces the number of trigonometric calculations to optimize distance calculations in a host device.

Generally, the activity region or frequently visited locations by a host device is mainly located within a city or a rather large but limited area. Furthermore, a user's stay area generally tends to be in a smaller area within the city or the limited area. As a result, a Pythagorean calculation using the differences in latitude and longitude can be used as an approximation of the distance between two nearby points on a sphere. Returning to FIG. 10, the distance (AB 508) between points A 502 and B 504 can be approximated by first calculating the latitude distance (AM 510), between point A 502 and point M 506, and the longitude distance (BM 512), between point B 504 and point M 506.

As an example, the error in using the simplified calculation in comparison to the haversine formula for two points separated by two-hundred sixty-three (263) kilometers (km) is approximately seventeen point one (17.1) meters (m). This error value is further reduced as the distance of the two points become nearer to each other. As an example, the difference in calculation for distance between two points separated at a distance of seventy-two (72) km is about point-three (0.3) m.

It should be understood that this approximation is more accurate especially at lower latitudes, in particular at latitudes lower than sixty (60) degrees. In some embodiments, to improve accuracy, boundary conditions may be set to optimize distance calculations in response to the location points being less than or greater than latitudes of sixty (60) degrees.

Figure 11:
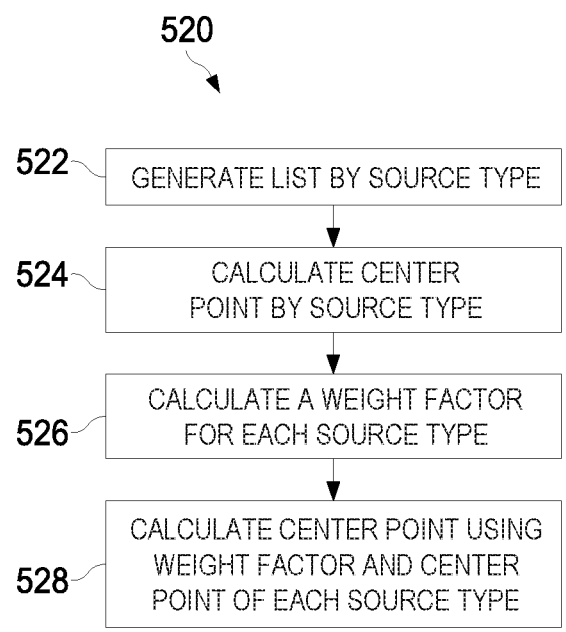
FIG. 11 is a flowchart of an embodiment method for determining a center point location within a cluster of data points.

FIG. 11 is a flowchart of an embodiment method 520 for determining a center point location within a cluster of data points, as may be performed by a timeline service. The embodiment method 520 provides an approximate calculation of a center point of a cluster of a data points related to a user stay area while reducing the influence of drift. As each location point in the user stay area may be collected from one of a variety of sources with varying accuracies (e.g., GPS, NLP, Cell-ID, etc.), the method to calculate the center of the cluster of location points can affect the accuracy of the center point. In some embodiments, all location points without taking into account the quality of each data point may be used. As an example, location points collected using higher accuracy sources such as a GPS signal may be used for center point calculation while location points obtained using a network location provider signal may be ignored.

At step 522, a location list of the cluster points to be used for the calculation of the center point is generated in accordance with the collection source type (e.g., GPS, NLP, etc.). At step 524, the center point for each collection source type is individually calculated. At step 526, a weight factor is applied to each calculated center point by dividing the total number of points per source by the total number of points in the cluster of points. At step 528, the center point location is calculated based on the weight factor applied to each center point type.

FIG. 12 is a flowchart of an embodiment method 550 for determining an optimized user stay area distance threshold and a user stay area time interval threshold used in the timeline service of FIG. 9. In some embodiments, the user stay area distance threshold and the user stay area time interval threshold may be set an initial value, for example, respectively five-hundred (500) meters and fifteen (15) minutes. As additional location points are collected and recorded, and multiple user stay areas are established, the embodiment method 550 provides an optimization of the threshold values based on historical values associated with previous user stay areas.

Generally, the range of the user stay area can provide key information about the size of a building or a radius of user activities corresponding with the user stay area. In some embodiments, the range can be determined by calculating the distance between each two points within a cluster of points in the user stay area and then dividing by half the greatest calculated distance between these points. In another embodiment, the range can be determined by calculating the distance between each point in the cluster of points and the center of the cluster, and subsequently selecting the greatest distance as the range of the user stay area. This has the added benefit of reducing the calculation time for the range from $N^2$ operations to N operations.

Range information and time interval information corresponding with historical cluster points within recorded user stay areas of a host device can provide a feasible user stay area distance threshold and a user stay area time interval threshold. At step 552, the current location coordinates of the host device is collected, using for example the method introduced at step 466 of FIG. 9.

At step 554, the timeline service determines if a previous user stay area meets the criteria of i) nearest user stay area to the current location collected at step 552 and 2) whether the distance of the current location to the center point of the user stay area is less than the distance threshold. The distance between the two points may be calculated using, for example the methods described with respect to FIG. 10.

At step 556, if a user stay area is found to meet the criteria detailed in step 554, the current distance threshold is updated to the user stay area distance and the current time threshold is updated to, for example, 3 minutes. However, if a user stay area is not found to meet the criteria detailed in step 554, the timeline service continues to use the initial threshold settings (i.e., distance threshold of five-hundred (500) meters and time threshold of fifteen (15) minutes). The distance threshold and time threshold as determined using the embodiment method of FIG. 12 may be used, for example, at step 462 of FIG. 9 and step 472 of FIG. 9, respectively.

FIG. 13 is a flowchart of an embodiment method 600 for optimizing user activity data to reduce noise, as may be performed by a timeline service. User activity data typically includes inconsistent or noisy signals that can misidentify or incorrectly skew timeline reference points. It is therefore valuable to provide smoothing solutions to reduce unwanted noise from a user activity recognition data set. At step 602, the raw set of data points associated with a user's movement is received by the timeline service. The raw set of data points are real-time results collected using an activity recognition engine implemented in a processor connected to embedded sensors. In general, the raw set of data points are a collection of changes in activity within a sliding time window. However, viewed in a broader context and over a period of time, the raw data may present unnecessary data points that may provide non-value added information to the user's timeline. As an example, if the host device is driving in a vehicle from point A to point B with one or more stops necessitated by traffic lights, the raw data set may include still movements at the traffic lights, however in the broader context, this information can be ignored. As another example, if the host device slows down due to construction, the activity recognition engine may categorize the user's movement as a slow movement type associated with a bike. It would therefore be beneficial to remove the unwanted noise from the data sets.

At step 604, the timeline service removes the inconsistent data within the raw set of data points by monitoring significant changes within a time period or sliding window. At step 606, the start and end time for each continuous set of data points for a user movement is updated by removing or ignoring the noisy data from the data set. At step 608, the raw set of data points are replaced with a set of smoothed data points.

FIG. 14 is a flowchart of an embodiment method 630 for refinement of a user's timeline using activity recognition data, as may be performed in a timeline service of a host device. Embedded sensors provide a continuous and low-power resource for improving accuracy of timeline services and can be used as a complimentary service to refine a user's stay area timeline. At step 632, the user's movement type as recorded using an activity recognition engine is determined. As previously noted, a user's activity may be categorized by movement type to a still, slow, or a fast movement type. In addition, the time parameters associated with the particular activity is recorded (i.e., start time and end time).

At step 634, the timeline service receives user stay area parameters such as the user's current location status (i.e., within or outside of a user stay area), the arrival time, and departure time of the host device corresponding with the user stay area.

At step 636, the timeline service uses the information obtained from step 632 to adjust the location status and related parameters from step 634. In an embodiment, if the user's activity is determined to be of a still type movement, within a period of time that the timeline service originally detected a change in user stay area, the data obtained from step 632 is used to revert the change in user stay area status and the arrival time and/or the departure time is corrected.

In another embodiment, if the user's activity is determined to be of a fast type movement, within a period of time that the timeline service originally detected no change in a user's stay area, the timeline service requests a current location of the host device if the user's movements indicate a change in the user's stay area. Otherwise, the timeline service updates the current user stay area status to no indicate that it is no longer in the particular user stay area and adjusts the departure time.

FIGS. 15A-D are example embodiments used to illustrate a refinement to a user's stay area timeline using activity recognition data, as may be performed in a timeline service of a host device. In these examples, embedded sensors in the host device detect a change in a user's activity and the timeline service utilizes a fusion scheme to improve the accuracy of an arrival time, departure time, or length of stay associated with a user stay area.

Figure 15A:
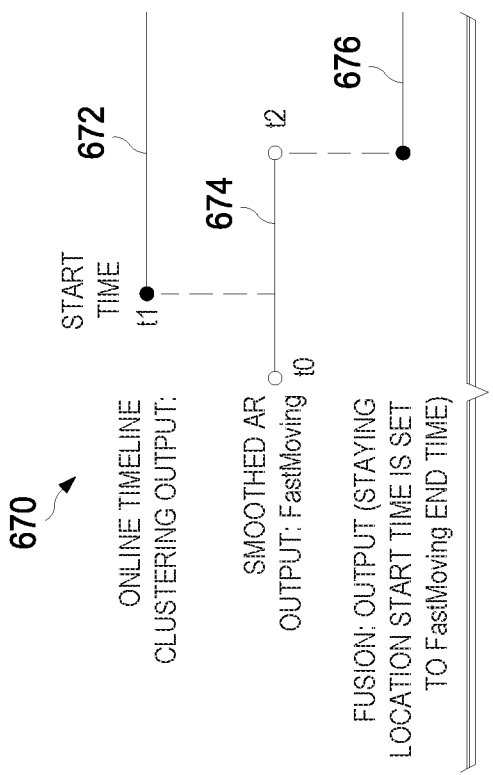
FIGS. 15A-D are example embodiments used to illustrate a refinement to a user's stay area timeline using activity recognition data.

In FIG. 15A, the arrival time of a host device in the original timeline 652 associated with a particular user's stay area is recorded to be at time $t_1$. However, in the activity recognition timeline 654, obtained from embedded sensors, the user's activity is shown to be of the still movement type since time $t_0$. Embodiment methods of this disclosure provide a fusion scheme to generate an adjusted timeline 656 with an adjusted arrival time of time $t_0$.

Figure 15C:
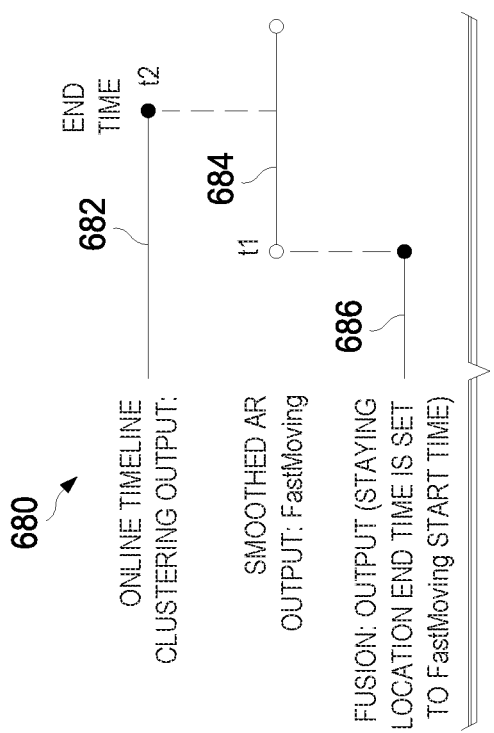
Figure 15B:
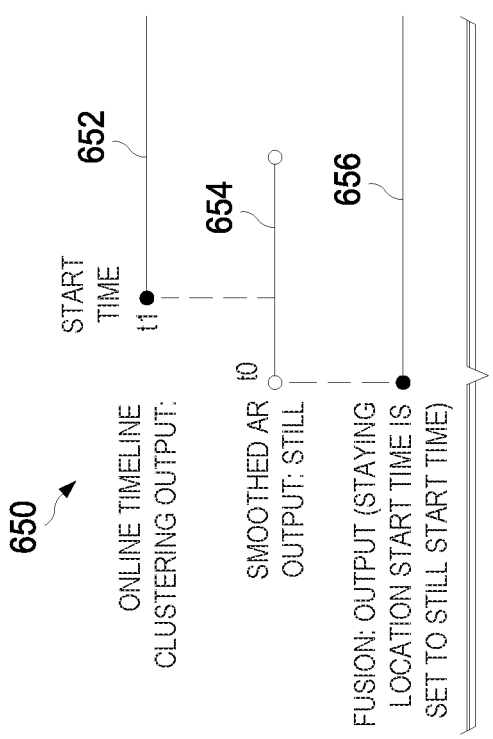

In FIG. 15B, the departure time of a host device in the original timeline 662 associated with a particular user's stay area is recorded to be at time $t_2$. However, in the activity recognition timeline 664, obtained from embedded sensors, the user's activity is shown to be of the still movement type until time $t_3$. Embodiment methods of this disclosure provide a fusion scheme to generate an adjusted timeline 666 with an adjusted departure time of time $t_3$.

In FIG. 15C, the arrival time of a host device in the original timeline 672 associated with a particular user's stay area is recorded to be at time $t_1$. However, in the activity recognition timeline 674, obtained from embedded sensors, the user's activity is shown to be of the fast movement type from time $t_0$ up through time $t_2$. Embodiment methods of this disclosure provide a fusion scheme to generate an adjusted timeline 676 with an adjusted arrival time of time $t_2$.

Figure 15D:
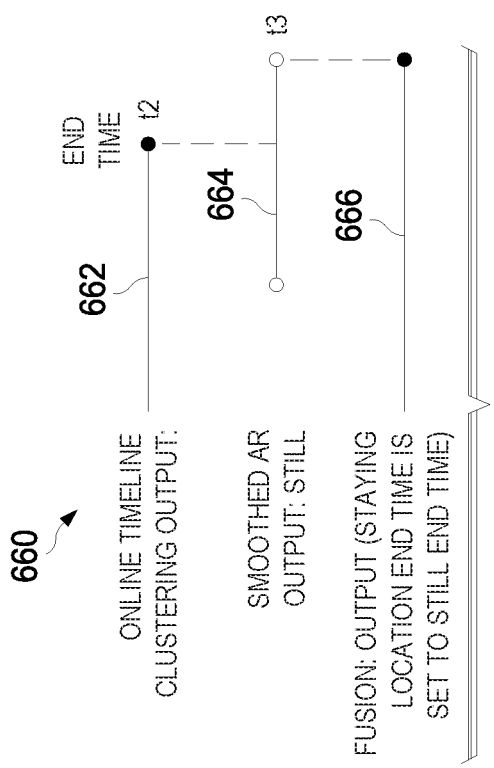

In FIG. 15D, the departure time of a host device in the original timeline 682 associated with a particular user's stay area is recorded to be at time $t_2$. However, in the activity recognition timeline 684, obtained from embedded sensors, the user's activity is shown to be of the fast movement type since time $t_1$. Embodiment methods of this disclosure provide a fusion scheme to generate an adjusted timeline 686 with an adjusted departure time of time $t_1$.

Figure 16:
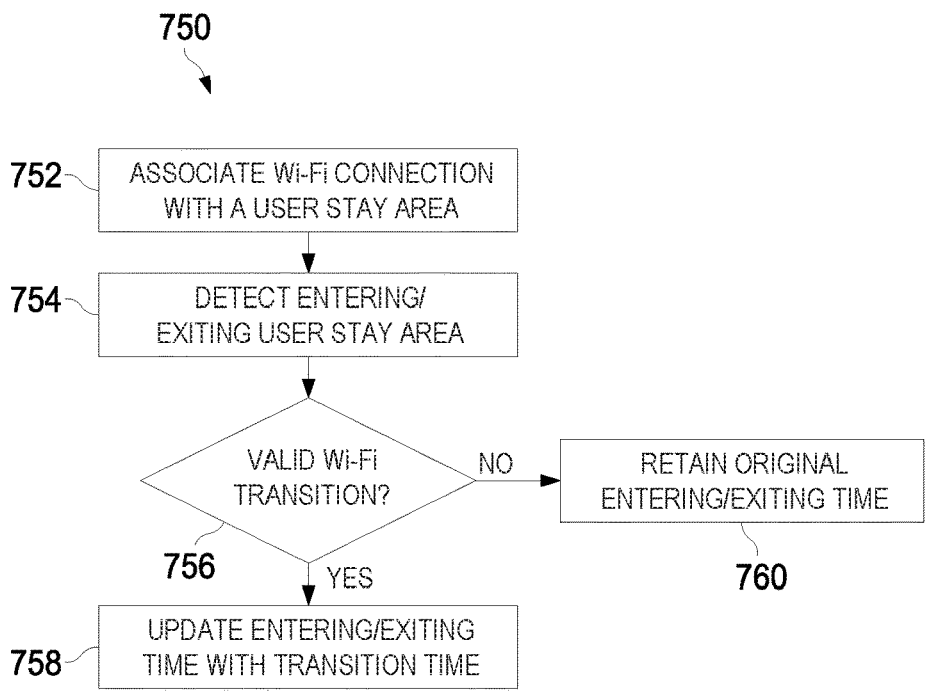
FIG. 16 is a flowchart of an embodiment method for determining a change in a user stay area leaving time and/or arriving time based on Wi-Fi connection activity.

FIG. 16 is a flowchart of an embodiment method 750 for determining a change in a user stay area leaving time and/or arriving time based on Wi-Fi connection activity. The change in Wi-Fi status may provide valuable information in a timeline service in determining a change in a user's location status or a change in a user's location. As an example, if a host device is to enter a building with an active Wi-Fi connection, the time corresponding with a successful connection to the Wi-Fi service may approximately correspond with an arrival time to the building user stay area. As another example, if the host device is to exit a building with an active Wi-Fi connection, the time corresponding with a successful disconnect from the Wi-Fi service may approximately correspond with a departure time from the building user stay area. In some embodiments, the time corresponding with the successful connection to the Wi-Fi service and/or the time corresponding with the successful disconnect from the Wi-Fi service may have a higher priority than location data obtained from an activity recognition engine, a network location provider signal, or a GPS signal.

At step 752, the host device associates a relationship between a Wi-Fi service and a user stay area. A learning algorithm implemented in the host device may be used to associate a relationship (e.g., Service Set Identifier (SSID), Media Access Control (MAC) address, Signal Strength, etc.) between a valid Wi-Fi signal and a user's stay area. As an example, a home Wi-Fi service may be identified and recorded as an associated location for a home of the user of the host device. As another example, a work Wi-Fi service may be identified and recorded as an associated location for a work place of the user of the host device. This advantageously allows the timeline service to filter out undesired Wi-Fi services associated with unknown buildings.

At step 754, commensurate with the host device entering or exiting a user stay area, a trigger message may be produced to investigate a valid change in Wi-Fi status. The trigger message may also set a set allotted time in which the host device is to complete the investigation.

At step 756, a valid change in Wi-Fi status is investigated within an allotted time interval. At step 758, if a valid Wi-Fi status transition is determined within the allotted time interval, the timestamp corresponding with the valid Wi-Fi status change is used for the user stay area arrival time or departure time. However, if a valid Wi-Fi status transition is not determined within the allotted time interval, at step 760, the original timestamp corresponding with location data obtained from the activity recognition engine, the network location provider signal, or the GPS signal is used for the user stay area arrival time or departure time.

In an example implementation of the embodiments of this disclosure, for a user stay area with a radius of up to five-hundred (500) meters and a duration of less than fifteen (15) minutes, the accuracy is shown to be greater than 93% with a memory usage of less than ten (10) megabytes.

Figure 17:
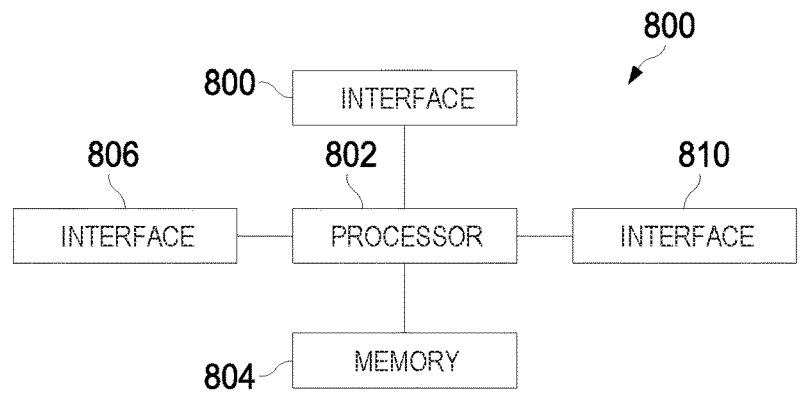
FIG. 17 is a diagram of an embodiment processing system.

FIG. 17 illustrates a block diagram of an embodiment processing system 800 for performing methods described herein, which may be installed in a host device. As shown, the processing system 800 includes a processor 802, a memory 804, and interfaces 806, 808, 810 which may (or may not) be arranged as shown in FIG. 17. The processor 802 may be any component or collection of components adapted to perform computations and/or other processing related tasks, and the memory 804 may be any component or collection of components adapted to store programming and/or instructions for execution by the processor 802. In an embodiment, the memory 804 includes a non-transitory computer readable medium. The non-transitory computer-readable media includes all types of computer readable media, including magnetic storage media, optical storage media, flash media, and solid-state storage media. It should be understood that software can be installed in and sold with the processing system 800. Alternatively, the software can be obtained and loaded into the processing system 800, including obtaining the software through physical medium or distribution system, including, for example, from a server owned by the software creator or from a server not owned but used by the software creator. The software can be stored on a server for distribution over the internet, for example. The interfaces 806, 808, 810 may be any component or collection of components that allow the processing system 800 to communicate with other devices/components and/or a user. For embodiment, one or more of the interfaces 806, 808, 810 may be adapted to communicate data, control, or management messages from the processor 802 to applications installed on the host device and/or a remote device. As another embodiment, one or more of the interfaces 806, 808, 810 may be adapted to allow a user or user device (e.g., personal computer (PC), etc.) to interact/communicate with the processing system 800. The processing system 800 may include additional components not depicted in FIG. 17, such as long-term storage (e.g., non-volatile memory, etc.).

In some embodiments, the processing system 800 is included in a network device that is accessing, or part otherwise of, a telecommunications network. In one embodiment, the processing system 800 is in a network-side device in a wireless or wireline telecommunications network, such as a base station, a relay station, a scheduler, a controller, a gateway, a router, an applications server, or any other device in the telecommunications network. In other embodiments, the processing system 800 is in a user-side device accessing a wireless or wireline telecommunications network, such as a mobile station, a user equipment (UE), a personal computer (PC), a tablet, a wearable communications device (e.g., a smartwatch, etc.), a wireless capable vehicle, a wireless capable pedestrian, a wireless capable infrastructure element or any other device adapted to access a telecommunications network.

Figure 18:
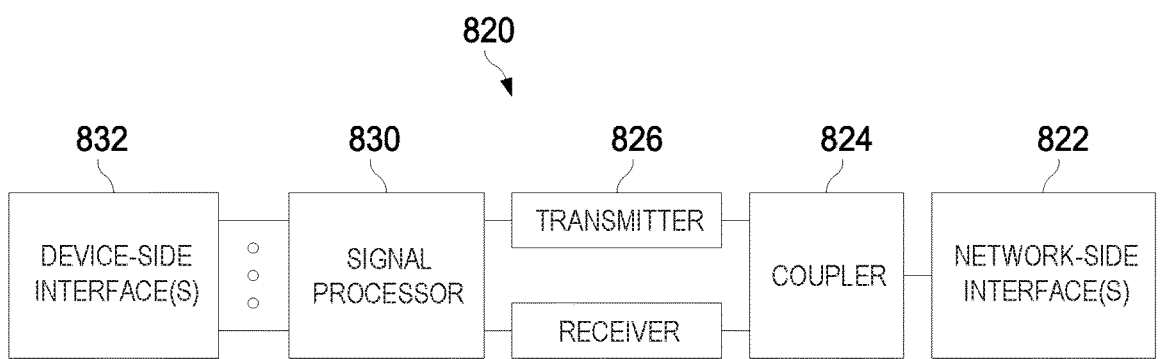
FIG. 18 is a diagram of an embodiment transceiver.

In some embodiments, one or more of the interfaces 806, 808, 810 connects the processing system 800 to a transceiver adapted to transmit and receive signaling over the telecommunications network. FIG. 18 illustrates a block diagram of a transceiver 820 adapted to transmit and receive signaling over a telecommunications network. The transceiver 820 may be installed in a host device. As shown, the transceiver 820 includes a network-side interface 822, a coupler 824, a transmitter 826, a receiver 828, a signal processor 830, and a device-side interface 832. The network-side interface 822 may include any component or collection of components adapted to transmit or receive signaling over a wireless or wireline telecommunications network. The coupler 824 may include any component or collection of components adapted to facilitate bi-directional communication over the network-side interface 822. The transmitter 826 may include any component or collection of components (e.g., up-converter, power amplifier, etc.) adapted to convert a baseband signal into a modulated carrier signal suitable for transmission over the network-side interface 822. The receiver 828 may include any component or collection of components (e.g., down-converter, low noise amplifier, etc.) adapted to convert a carrier signal received over the network-side interface 822 into a baseband signal. The signal processor 830 may include any component or collection of components adapted to convert a baseband signal into a data signal suitable for communication over the device-side interface(s) 832, or vice-versa. The device-side interface(s) 832 may include any component or collection of components adapted to communicate data-signals between the signal processor 830 and components within the host device (e.g., the processing system 800, local area network (LAN) ports, etc.).

The transceiver 820 may transmit and receive signaling over any type of communications medium. In some embodiments, the transceiver 820 transmits and receives signaling over a wireless medium. For embodiment, the transceiver 820 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 822 includes one or more antenna/radiating elements. For embodiment, the network-side interface 822 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 820 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Although the description has been described in detail, it should be understood that various changes, substitutions and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps. The specification and drawings are, accordingly, to be regarded simply as an illustration of the disclosure as defined by the appended claims, and are contemplated to cover any and all modifications, variations, combinations or equivalents that fall within the scope of the present disclosure.

What is claimed is:

1. A device, comprising:
   one or more embedded sensors configured to detect movement of a user of the device;
   a non-transitory memory storage storing instructions; and
   one or more processors in communication with the non-transitory memory storage and the one or more embedded sensors, wherein the one or more processors execute the instructions to perform operations including:
      passively collecting location information of the device based on one or more requests from a third party application or service on the device;
      initiating a first intent for a location request requesting a current location of the device, based on a first measured movement in a first period of time exceeding a threshold;
      determining a second measured movement in a second period of time after the initiating;
      determining, based on the second measured movement being less than the threshold, that a duration of time between a previous collection of location information of the device and the initiation of the first intent for the location request exceeds a first time threshold; and
      based on the determining that the duration of time exceeds the first time threshold, requesting the current location of the device.

2. The device of claim 1, wherein the initiating the first intent for the location request comprises:
   initiating the first intent for the location request based on a time elapsed from a previous initiation of an intent for the location request.

3. The device of claim 1, wherein the initiating the first intent for the location request comprises:

initiating the first intent for the location request based on a type of the movement of the user.

4. The device of claim 3, wherein the initiating the first intent for the location request comprises:
initiating the first intent for the location request based on the movement of the user being a fast movement type while the device is located within a user stay area.

5. The device of claim 3, wherein the initiating the first intent for the location request comprises:
initiating the first intent for the location request based on the movement of the user being a slow movement type or a still type while the device is not located within a user stay area.

6. The device of claim 1, wherein the initiating the first intent for the location request comprises:
initiating the first intent for the location request based on detection of a change in a cellular identification (Cell-ID) of the device.

7. The device of claim 1, wherein the initiating the first intent for the location request comprises:
initiating the first intent for the location request in response to the device exiting a user stay area or entering a new user stay area.

8. The device of claim 1, wherein the requesting the current location of the device comprises:
selecting a source for collecting information of the current location of the device; and
collecting the information of the current location of the device using the source.

9. The device of claim 1, wherein the requesting the current location of the device comprises:
determining that the device is connected to an active network location provider; and
collecting the current location of the device using the active network location provider upon determining that an accuracy of location information provided by the active network location provider exceeds an accuracy threshold.

10. The device of claim 1, wherein the requesting the current location of the device comprises:
collecting the current location of the device using global positioning satellite signals.

11. The device of claim 1, wherein the initiating the first intent is performed locally within the device.

12. A computer-implemented method comprising:
passively collecting, with one or more processors of a device, location information of the device based on one or more requests from a third party application or service on the device;
initiating, with the one or more processors, a first intent for a location request requesting a current location of the device, based on a first measured movement in a first period of time exceeding a threshold;
determining, with the one or more processors, a second measured movement in a second period of time after the initiating;
determining, with the one or more processors, based on the second measured movement being less than the threshold, that a duration of time between a previous collection of location information of the device and the initiation of the first intent for the location request exceeds a first time threshold; and
based on the determining that the duration of time exceeds the first time threshold, requesting the current location of the device.

13. The computer-implemented method of claim 12, wherein the initiating the first intent for the location request comprises:
initiating the first intent for the location request based on a time elapsed from a previous initiation of an intent for the location request.

14. The computer-implemented method of claim 12, wherein the initiating the first intent for the location request comprises:
initiating the first intent for the location request based on a type of movement of a user of the device.

15. The computer-implemented method of claim 14, wherein the initiating the first intent for the location request comprises:
initiating the first intent for the location request based on the movement of the user being a fast movement type while the device is located within a user stay area.

16. The computer-implemented method of claim 14, wherein the initiating the first intent for the location request comprises:
initiating the first intent for the location request based on the movement of the user being a slow movement type or a still type while the device is not located within a user stay area.

17. The computer-implemented method of claim 12, wherein the initiating the first intent for the location request comprises:
initiating the first intent for the location request based on detection of a change in a cellular identification (Cell-ID) of the device.

18. The computer-implemented method of claim 12, wherein the initiating the first intent for the location request comprises:
initiating the first intent for the location request in response to the device exiting a user stay area or entering a new user stay area.

19. The computer-implemented method of claim 12, wherein the requesting the current location of the device comprises:
selecting a source for collecting information of the current location of the device; and
collecting the information of the current location of the device using the source.

* * * * *